US012381998B2

(12) United States Patent
Nold et al.

(10) Patent No.: US 12,381,998 B2
(45) Date of Patent: *Aug. 5, 2025

(54) EVENT BASED RECORDING

(71) Applicant: Google LLC, Mountain View, CA (US)

(72) Inventors: John Jordan Nold, Longmont, CO (US); Joe Delone Venters, Alameda, CA (US); Liana Kong, Mountain View, CA (US); Scott Mullins, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/543,961

(22) Filed: Dec. 18, 2023

(65) Prior Publication Data
US 2024/0146866 A1 May 2, 2024

Related U.S. Application Data

(63) Continuation of application No. 17/638,677, filed as application No. PCT/US2020/049368 on Sep. 4, 2020, now Pat. No. 11,895,433.
(Continued)

(51) Int. Cl.
*H04N 5/77* (2006.01)
*G11B 27/031* (2006.01)
(52) U.S. Cl.
CPC ............. *H04N 5/77* (2013.01); *G11B 27/031* (2013.01)
(58) Field of Classification Search
CPC .................................. H04N 5/77; G11B 27/031
See application file for complete search history.

(56) References Cited

U.S. PATENT DOCUMENTS 10,319,410 B1 *  6/2019  Townsend .............. G11B 27/30
11,895,433 B2     2/2024  Nold et al.
(Continued)

FOREIGN PATENT DOCUMENTS

CN     103262169     8/2013
CN     105122789     12/2015
(Continued)

OTHER PUBLICATIONS

"Foreign Office Action", JP Application No. 2022-513272, Apr. 4, 2023, 17 pages.
(Continued)

*Primary Examiner* — Sunghyoun Park
(74) *Attorney, Agent, or Firm* — Colby Nipper PLLC

(57) ABSTRACT

An electronic device comprises an image sensor, one or more processors, and memory storing instructions for receiving an event recording profile based on configuration data of the electronic device, the configuration data including a location type or a power type; receiving a plurality of images of a scene captured by the image sensor; detecting a trigger event based on one or more of the plurality of images of the scene; in response to detecting the trigger event, identifying an object of interest in one or more of the plurality of images of the scene; creating an event clip from the stored images that include the object of interest, wherein creating the event clip includes configuring a clip length based on the event recording profile; and providing the event clip for display.

20 Claims, 13 Drawing Sheets

Related U.S. Application Data

(60) Provisional application No. 62/897,233, filed on Sep. 6, 2019.

(56) References Cited

U.S. PATENT DOCUMENTS

| | | | |
|---|---|---|---|
| 2010/0040341 A1* | 2/2010 | Yeh, Jr. .............. | G11B 27/3027 386/239 |
| 2014/0085480 A1* | 3/2014 | Saptharishi ...... | H04N 21/23113 348/159 |
| 2014/0359483 A1* | 12/2014 | Forutanpour ........... | G06F 16/58 715/753 |
| 2015/0243325 A1 | 8/2015 | Pacurariu et al. | |
| 2016/0105644 A1* | 4/2016 | Smith .............. | G08B 13/19667 348/159 |
| 2016/0225410 A1 | 8/2016 | Lee et al. | |
| 2017/0064247 A1 | 3/2017 | Schwartz et al. | |
| 2017/0076156 A1* | 3/2017 | Borel .................. | G11B 27/031 |
| 2017/0125058 A1* | 5/2017 | Shearman ........... | G11B 27/031 |
| 2017/0262697 A1* | 9/2017 | Kaps .................... | G11B 27/022 |
| 2018/0330169 A1 | 11/2018 | Van Hoof et al. | |
| 2018/0332267 A1 | 11/2018 | Hesla et al. | |
| 2019/0013047 A1* | 1/2019 | Wait .................... | G11B 27/002 |
| 2019/0020827 A1 | 1/2019 | Siminoff | |
| 2022/0295008 A1 | 9/2022 | Nold et al. | |

FOREIGN PATENT DOCUMENTS

| | | |
|---|---|---|
| CN | 107223316 | 9/2017 |
| CN | 107690305 | 2/2018 |
| JP | 2003271605 | 9/2003 |
| JP | 2006019845 | 1/2006 |
| JP | 2013062696 A | 4/2013 |
| JP | 2017503394 | 1/2017 |
| JP | 2019012871 A | 1/2019 |
| KR | 101467219 B1 | 12/2014 |
| WO | 2016014724 | 1/2016 |
| WO | 2016095072 | 6/2016 |
| WO | 2016095367 | 6/2016 |
| WO | 2021046324 | 3/2021 |

OTHER PUBLICATIONS

"Foreign Office Action", EP Application No. 20775505.9, Apr. 4, 2023, 6 pages.
"Foreign Office Action", CN Application No. 202080062601.9, May 31, 2023, 42 pages.
"Foreign Office Action", KR Application No. 10-2022-7007241, Nov. 17, 2023, 15 pages.
"Foreign Office Action", CN Application No. 202080062601.9, Dec. 20, 2022, 25 pages.
"International Preliminary Report on Patentability", Application No. PCT/US2020/049368, Mar. 8, 2022, 10 pages.
"International Search Report and Written Opinion", Application No. PCT/US2020/049368, Nov. 4, 2020, 13 pages.
"Non-Final Office Action", U.S. Appl. No. 17/638,677, Jun. 23, 2023, 12 pages.
"Notice of Allowance", U.S. Appl. No. 17/638,677, Sep. 29, 2023, 7 pages.
"Foreign Office Action", JP Application No. 2023-199026, Jan. 7, 2025, 14 pages.
"Foreign Office Action", EP Application No. 20775505.9, Dec. 12, 2024, 5 pages.

* cited by examiner

Formulas 442

| Outdoor Formula 502 | |
|---|---|
| Padding: 2s / 2s | |
| Inactivity Threshold: 30s | |
| Max Event Length: 5h | |
| Event Priority | |

| | |
|---|---|
| 1 | Security / Emergency |
| 2 | Person (unfamiliar) |
| 3 | Person (familiar) |
| 4 | Person (uncategorized) |
| 5 | No face ID (body) |
| 6 | Package |
| 7 | Vehicle |
| 8 | Animal (pet) |
| 9 | Talking (person heard) |
| 10 | Glass breaking |
| 11 | Knocking / doorbell |
| 12 | Dog barking |
| 13 | Baby crying |
| 14 | All other motion |

| Indoor Formula 504 | |
|---|---|
| Padding: 2s / 5s | |
| Inactivity Threshold: 30s | |
| Max Event Length: 1h | |
| Event Priority | |

| | |
|---|---|
| 1 | Security / Emergency |
| 2 | Person (unfamiliar) |
| 3 | Person (familiar) |
| 4 | Person (uncategorized) |
| 5 | No face ID (body) |
| 6 | Talking (person heard) |
| 7 | Animal (pet) |
| 8 | Knocking / doorbell |
| 9 | Glass breaking |
| 10 | Dog barking |
| 11 | Baby crying |
| 12 | Vehicle |
| 13 | Package |
| 14 | All other motion |

Figure 5

EVENT BASED RECORDING

RELATED APPLICATIONS

This application is a continuation of and claims priority to U.S. patent application Ser. No. 17/638,677, filed on Feb. 25, 2022, which is a national stage entry of International Patent Application No. PCT/US2020/049368, filed Sep. 4, 2020, which claims the benefit of U.S. Provisional Patent Application No. 62/897,233, filed Sep. 6, 2019, the disclosures of which are hereby incorporated by reference in their entirety.

TECHNICAL FIELD

This application relates generally to electronic devices, including but not limited to cameras and electronic assistant devices that provide relevant video clips of events of interest while providing enhanced power and bandwidth savings.

BACKGROUND

Streaming devices are becoming increasingly prevalent. As the number of streaming devices increases, bandwidth limits become more of a concern due to the increased streaming demands. For instance, a single-family home equipped with security cameras and streaming entertainment services could easily max out the home's monthly bandwidth allotment set by the home's internet service provider, especially if these devices are streaming high definition video data twenty-four hours a day.

In addition to bandwidth issues, streaming can also be a power-intensive process. While power-hungry streaming devices may negatively affect an electric bill, high power budgets also negatively affect the ability for devices to scale down in size and become portable. As electronic devices because more compact and mobile, it becomes difficult to continuously support power-hungry processes such as continuous video streaming.

A proposed solution to the bandwidth and power issues caused by continuous streaming applications involves a more targeted streaming approach. However, by limiting the scenarios during which a streaming device can capture data and transmit it over a network, various tradeoffs arise regarding device functionality. For example, a security camera may be designed to minimize recording and streaming in order to save bandwidth and power, but reducing camera usage runs the risk of important security-related events being missed.

SUMMARY

Accordingly, there is a need for streaming systems and/or devices with more efficient, accurate, and intuitive methods for saving bandwidth and power while reducing impacts to device functionality. Such systems, devices, and methods optionally complement or replace conventional systems, devices, and methods for event identification, categorization, and/or presentation by providing an improved approach to targeted device operation while optimizing device functionality.

The concepts described herein include the use of dynamic formulas which alter themselves based on the placement of a device, the device's intended usage, and adaptations from what the device learns about its surroundings over time. The formulas are used for the targeted operations of a device (e.g., targeted recording of events) by implementing adjustable parameters such as padding (e.g., the amount of time to record before and after detection of an object of interest), inactivity (e.g., the amount of time to wait before ending an event instead of continuing the event to include subsequent activity), maximum length (e.g., how long the event may last before the device ceases recording), cool-off (e.g., a rate of object detections above which the recording of an event ceases), and/or object filters and priority (e.g., determining which objects may count as a basis for recording an event). These adjustable parameters are based on one or more of (i) the location of the device (e.g., indoors, outdoors, which room, and so forth), (ii) the purpose of the device (e.g., what is in the field of view of the device, and what the user is interested in seeing), and/or (iii) the type of the device (e.g., wired or battery-powered).

In one aspect, a method is disclosed, the method comprising, at an electronic device having an image sensor, one or more processors, and memory storing instructions for execution by the one or more processors: obtaining an event recording profile for the electronic device, wherein the event recording profile is based on configuration data of the electronic device, the configuration data including a location type or a power type; obtaining from the image sensor and storing on the electronic device a plurality of images of a scene; detecting a trigger event based on one or more of the plurality of images of the scene; in response to detecting the trigger event, identifying an object of interest in one or more of the plurality of images of the scene; creating an event clip from the stored images that include the object of interest, wherein creating the event clip includes configuring a clip length based on the event recording profile; and providing the event clip for display.

In some implementations, configuring the clip length includes setting a padding value, an inactivity threshold, and/or a maximum event length.

In some implementations, configuring the clip length includes selecting a padding value; the padding value corresponds to a number of obtained images preceding the one or more of the plurality of images which include the detected object of interest; and creating the event includes adding the number of images to a plurality of images which include the detected object of interest.

In some implementations, configuring the clip length includes selecting an inactivity threshold; the inactivity threshold corresponds to a number of obtained images in which the object of interest is no longer detected; and creating the event includes adding the number of images to a plurality of images which include the detected object of interest.

In some implementations, configuring the clip length includes selecting a maximum event length; the maximum event length corresponds to a maximum number of images for the event; and creating the event includes ending the event upon reaching the maximum number of images.

In some implementations, the configuration data includes a location type corresponding to a particular area of the environment; and configuring the event length based on the event recording profile includes selecting the padding value, the inactivity threshold, and/or the maximum event length based on the particular area of the environment in which the electronic device is located.

In some implementations, the configuration data is a power type; and configuring the event length based on the event recording profile includes selecting the padding value, the inactivity threshold, and/or the maximum event length based on whether the power type of the electronic device is wired or battery powered.

In some implementations, the configuration data further includes object priority data; and configuring the event length based on the event recording profile includes selecting the padding value, the inactivity threshold, and/or the maximum event length based on a priority of the identified object of interest in accordance with the object priority data.

In some implementations, configuring the clip length includes setting a cool-off value corresponding to an amount of time to wait between successive object detections after two or more object detections occur within a threshold amount of time.

In some implementations, configuring the clip length includes setting a padding value, an inactivity threshold, and a maximum event length in accordance with a combination of values associated with the event recording profile.

In some implementations, detecting the trigger event includes detecting motion in the scene based on an analysis of two or more of the plurality of images of the scene.

In some implementations, detecting the trigger event includes detecting the object of interest in the scene based on an analysis of one or more of the plurality of images of the scene.

In some implementations, the method further comprises combining the event clip with a previously created event clip to form a combined event clip; and wherein providing the event clip for display includes providing the combined event clip for display.

In another aspect, an electronic device comprises an image sensor; one or more processors; and memory storing instructions that, when executed by the one or more processors, cause the one or more processors to perform any combination of the operations described above.

In another aspect, a non-transitory computer-readable storage medium stores instructions that, when executed by an electronic device with an image sensor and one or more processors, cause the one or more processors to perform any combination of the operations described above.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

FIG. 5 is a block diagram illustrating example event formulas in accordance with some implementations.

Like reference numerals refer to corresponding parts throughout the several views of the drawings.

DESCRIPTION OF IMPLEMENTATIONS

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

Devices with cameras, such as security cameras, doorbell cameras, and assistant devices integrated with cameras can be used to collect visual inputs from the scenes (sometimes referred to as fields of view) in which the devices are installed or otherwise located. In some implementations, devices record clips of video data (referred to herein as events) and provide the clips for viewing by an occupant of the environment via a server system, hub, or other network-connected device. In some implementations, the parameters used for determining which events to record, which events to provide for viewing, and how to compose the event video clips are modified based on several aspects of the device, including but not limited to the device's location, purpose, and power type.

Figure 1A:
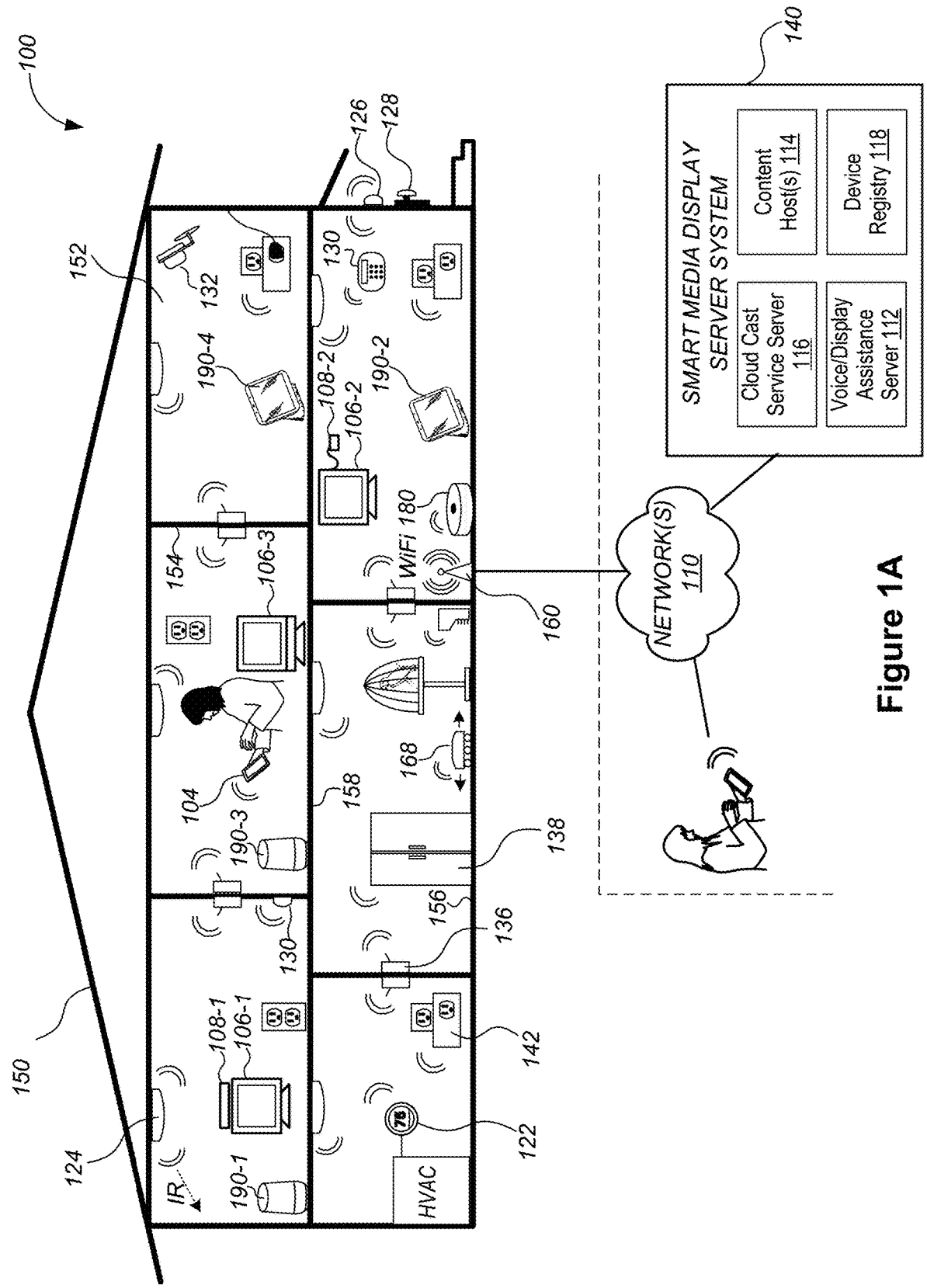
FIG. 1A is an example environment in accordance with some implementations.

FIG. 1A is an example environment 100 in accordance with some implementations. The term "environment" may refer to any space which includes one or more network connected or interconnected electronic devices (e.g., devices that perform one or more support functions, such as security cameras, voice assistant devices, and so forth). Example environments include homes (e.g., single-family houses, duplexes, townhomes, multi-unit apartment buildings), hotels, retail stores, office buildings, industrial buildings, yards, parks, and more generally any living space or work space. Environments may sometimes be referred to herein as home environments, homes, or environments.

In addition, the terms "user," "customer," "installer," "homeowner," "occupant," "guest," "tenant," "landlord," "repair person," and the like may be used to refer to a person or persons acting in the context of some particular situations described herein. These references do not limit the scope of the present teachings with respect to the person or persons who are performing such actions or are otherwise present within or in proximity to the environment. Thus, for example, the terms "user," "customer," "purchaser," "installer," "subscriber," and "homeowner" may often refer to the same person in the case of a single-family residential dwelling who makes the purchasing decision, buys a device (e.g., a network connected electronic device), installs the device, configures the device, and/or uses the device. However, in other scenarios, such as a landlord-tenant environment, the customer may be the landlord with respect to purchasing the device, the installer may be a local apartment supervisor, a first user may be the tenant, and a second user may again be the landlord with respect to remote control functionality. Importantly, while the identity of the person performing the action may be germane to a particular advantage provided by one or more of the implementations, such identity should not be construed in the descriptions that follow as necessarily limiting the scope of the present teachings to those particular individuals having those particular identities.

The environment 100 includes a structure 150 (e.g., a house, office building, garage, or mobile home) with various integrated devices (also referred to herein as "connected," "network connected," "interconnected," or "smart" devices). The depicted structure 150 includes a plurality of rooms 152, separated at least partly from each other via walls 154. The walls 154 may include interior walls or exterior walls. Each room may further include a floor 156 and a ceiling 158. Network connected devices may also be integrated into an environment 100 that does not include an entire structure 150, such as an apartment, condominium, or office space. In some implementations, the devices include one or more of: mobile devices 104 (e.g., tablets, laptops, mobile phones, smartphones, and so forth), display devices 106, media casting or streaming devices 108, thermostats 122, home protection devices 124 (e.g., smoke, fire and carbon dioxide detectors), home security devices (e.g., motion detectors, window and door sensors and alarms) including connected doorbell/cameras 126, connected locksets 128, connected alarm systems 130 and cameras 132, connected wall switches transponders 136, connected appliances 138, WiFi communication devices 160 (e.g., hubs, routers, extenders), connected home cleaning devices 168 (e.g., vacuums or floor cleaners), communication and control hubs 180, and/or electronic assistant devices 190 (also referred to herein as voice assistant devices and display assistant devices).

One or more media devices are disposed in the environment 100 to provide users with access to media content that is stored locally or streamed from a remote content source (e.g., content host(s) 114). In some implementations, the media devices include media output devices 106, which directly output/display/play media content to an audience, and cast devices 108, which stream media content received over one or more networks to the media output devices 106. Examples of the media output devices 106 include, but are not limited to, television (TV) display devices, music players, and computer monitors. Examples of the cast devices 108 include, but are not limited to, medial streaming boxes, casting devices (e.g., GOOGLE CHROMECAST devices), set-top boxes (STBs), DVD players, and TV boxes.

In the example environment 100, media output devices 106 are disposed in more than one location, and each media output device 106 is coupled to a respective cast device 108 or includes an embedded casting unit. The media output device 106-1 includes a TV display that is hard wired to a DVD player or a set top box 108-1. The media output device 106-3 includes a network connected TV device that integrates an embedded casting unit to stream media content for display to its audience. The media output device 106-2 includes a regular TV display that is coupled to a network connected TV box 108-1 (e.g., Google TV or Apple TV products), and such a TV box 108-2 streams media content received from a media content host server 114 and provides access to the Internet for displaying Internet-based content on the media output device 106-2.

In addition to the media devices 106 and 108, one or more electronic assistant devices 190 are disposed in the environment 100. The electronic assistant devices 190 collect audio inputs for initiating various media play functions of the electronic assistant devices 190 and/or the media devices 106 and 108. In some implementations, the electronic assistant devices 190 are configured to provide media content that is stored locally or streamed from a remote content source. In some implementations, the electronic assistant devices 190 are voice-activated and are disposed in proximity to a media device, for example, in the same room with the cast devices 108 and the media output devices 106. Alternatively, in some implementations, a voice-activated electronic assistant device (e.g., 190-1 or 190-3) is disposed in a room having one or more devices but not any media device. Alternatively, in some implementations, a voice-activated electronic assistant device 190 is disposed in a location having no networked electronic device. This allows for the electronic assistant devices 190 to communicate with the media devices and share content that is being displayed on one device to another device (e.g., from device 190-1 to device 190-2 and/or media devices 108).

The voice-activated electronic assistant device 190 includes at least one microphone, a speaker, a processor and memory storing at least one program for execution by the processor. The speaker is configured to allow the electronic assistant device 190 to deliver voice messages (e.g., messages related to media content items being presented or message as part of a conversation between a user and the electronic assistant device 190). In some embodiments, in response to a user query, the electronic assistant device 190 provides audible information to the user through the speaker. As an alternative to voice messages, visual signals can also be used to provide feedback to the user of the electronic assistant device 190 concerning the state of audio input processing, such as a visual notification displayed on the device.

In accordance with some implementations, an electronic device 190 is a voice-activated interface device that is configured to provide voice recognition functions with the aid of a server system 140. In some implementations, the server system 140 includes a cloud cast service server 116 and/or a voice/display assistance server 112. For example, in some implementations an electronic device 190 includes a network connected speaker that provides music (e.g., audio for video content being displayed on the electronic assistant device 190 or on a display device 106) to a user and allows eyes-free and/or hands-free access to a voice assistant service (e.g., Google Assistant). Optionally, the electronic device 190 is a voice interface device such as a speaker device or a device including a display screen having touch detection capability or no touch detection capability.

In some implementations, the electronic assistant devices 190 integrate a display screen in addition to the microphones, speaker, processor, and memory (e.g., 190-2 and 190-4). The display screen is configured to provide additional visual information (e.g., media content, information pertaining to media content, etc.) in addition to audio information that can be broadcast via the speaker of the electronic assistant device 190. When a user is nearby and the user's line of sight is not obscured, the user may review the additional visual information directly on the display screen of the electronic assistant device. Optionally, the additional visual information provides feedback to the user of the electronic device 190 concerning the state of audio input processing. Optionally, the additional visual information is provided in response to the user's previous voice inputs (e.g., user queries), and may be related to the audio information broadcast by the speaker. In some implementations, the display screen of the voice-activated electronic devices 190 is touch-sensitive and is configured to detect touch inputs on its surface (e.g., instructions provided through the touch-sensitive display screen). Alternatively, in some implementations, the display screen of the voice-activated electronic devices 190 is not a touch-sensitive screen.

When voice inputs from the electronic device 190 are used to control the electronic device 190 and/or media output devices 106 via the cast devices 108, the electronic assistant device 190 enables control of cast-enabled media devices independently of whether the electronic assistant device 190 has its own display. In an example, the electronic device 190 includes a speaker with far-field voice access and functions as a voice interface device for a network-implemented assistant service (e.g., Google Assistant).

The electronic device 190 can be disposed in any room in the environment 100. In some implementations, when multiple electronic assistant devices 190 are distributed in a plurality of rooms, the electronic assistant devices 190 become audio receivers that are synchronized to accept voice inputs from each of the plurality of rooms. For instance, a first electronic device 190-1 may receive a user instruction that is directed towards a second electronic device 190-2 (e.g., a user instruction of "OK Google, show this photo album on the kitchen device.").

Specifically, in some implementations, an electronic device 190 includes a network-connected speaker (e.g., connected through a Wi-Fi network) with a microphone that is connected to a voice-activated personal assistant service (e.g., Google Assistant). A user can issue a media play request via the microphone of the electronic assistant device 190, and ask the personal assistant service to play media content on the electronic assistant device 190 itself and/or on another connected media output device 106. For example, the user can issue a media play request by saying in proximity to the speaker, "OK Google, play cat videos on my living room TV." The personal assistant service then fulfills the media play request by playing the requested media content on the requested device using a default or designated media application.

A user can also make a voice request via the microphone of the electronic assistant device 190 concerning the media content that has already been played and/or is being played on an electronic assistant device 190. For instance, a user may instruct the electronic assistant device to provide information related to a current media content item being displayed, such as ownership information or subject matter of the media content. In some implementations, closed captions of the currently displayed media content are initiated or deactivated on the display device by voice when there is no remote control or a second screen device is available to the user. Thus, the user can turn on the closed captions on a display device via an eyes-free and hands-free voice-activated electronic assistant device 190 without involving any other device having a physical user interface.

In some implementations, the electronic assistant device 190 includes a display screen and one-or more built in cameras. The cameras are configured to capture images and/or videos, which are then transmitted (e.g., streamed) to a server system 140 for display on client devices(s) (e.g., authorized client devices 104).

In some implementations, the voice-activated electronic assistant devices 190 can be mounted on, integrated with, and/or supported by a wall 154, floor 156 or ceiling 158 of the environment 100. The integrated devices include intelligent, multi-sensing, network connected devices that integrate seamlessly with each other in a network and/or with a central server or a cloud-computing system to provide a variety of useful functions. In some implementations, a device is disposed at the same location of the environment 100 as a cast device 108 and/or an output device 106, and therefore, is located in proximity to or with a known distance with respect to the cast device 108 and the output device 106.

In some implementations, the environment 100 includes one or more network connected camera systems 132 (also referred to herein as cameras 132). In some embodiments, content that is captured by a camera 132 is displayed on an electronic assistant device 190 at a request of a user (e.g., a user instruction of "OK Google, show the baby room monitor.") and/or according to settings of the environment 100 (e.g., a setting to display content captured by a particular camera 132 during the evening or in response to detecting an intruder).

In some implementations, the environment 100 includes one or more network connected thermostats 122, hazard detectors 124, doorbells 126, door locks 128, alarm systems 130, camera systems 132, wall switches 136, appliances 138 (e.g., refrigerators, stoves, ovens, televisions, washers, and/or dryers), lights, stereos, intercom systems, garage-door openers, floor fans, ceiling fans, wall air conditioners, pool heaters, irrigation systems, security systems, space heaters, window air conditioning (AC) units, motorized duct vents, and so forth.

The environment 100 includes one or more other occupancy sensors (e.g., touch screens, IR sensors, ambient light sensors and motion detectors). In some implementations, the environment 100 includes radio-frequency identification (RFID) readers (e.g., in each room 152 or a portion thereof) that determine occupancy based on RFID tags located on or embedded in occupants. For example, RFID readers may be integrated into the network connected hazard detectors.

In some implementations, in addition to including sensing capabilities, one or more of the devices included in the environment 100 are capable of data communications, including information sharing with other devices, a central server, cloud-computing system, and/or other devices (e.g., the client device 104, the cast devices 108, and/or the electronic assistant devices 190) that are network connected. Similarly, in some implementations, each of the cast devices 108 and the electronic assistant devices 190 is also capable of data communications, including information sharing with other cast devices 108, electronic assistant devices 190, a central server or cloud-computing system 140, and/or other devices (e.g., client devices 104) that are network connected. Data communications may be carried out using certain custom or standard wireless network protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or certain custom or standard wired network protocols (e.g., Ethernet, HomePlug, etc.), or any other suitable communication protocol, including communication protocols not yet developed as of the filing date of this document.

In some implementations, the cast devices 108, the electronic assistant devices 190 and the other devices included in the environment 100 serve as wireless or wired repeaters. In some implementations, a first one of the cast devices 108 communicates with a second one of the cast devices 108 or one or more other devices via a wireless router. The cast devices 108, the electronic assistant devices 190 and the one or more other devices may further communicate with each other via a connection (e.g., network interface 160) to a network, such as the Internet 110. Through the Internet 110, the cast devices 108, the electronic assistant devices 190 and/or the one or more other devices may communicate with a server system 140 (also referred to herein as a central server system and/or a cloud-computing system). Optionally, the server system 140 may be associated with a manufacturer, support entity, or service provider associated with the one or more devices included in the environment 100 and/or the media content items displayed or otherwise presented to users.

In general, any of the connected electronic devices included in the environment 100 can be configured with a range of capabilities for interacting with users in the environment 100. For example, an electronic device can be configured with one or more microphones, one or more speakers, and/or voice-interaction capabilities in which a user interacts with the electronic device via voice inputs received by the microphone and audible outputs played back by the speakers to present information to users. Similarly, an electronic device can be configured with buttons, switches and/or other touch-responsive sensors (such as a touch screen, touch panel, or capacitive or resistive touch sensors) to receive user inputs, as well as haptic or other tactile feedback capabilities to provide tactile outputs to users. An electronic device can also be configured with visual output capabilities, such as a display panel and/or one or more indicator lights to output information to users visually, as described in U.S. patent application Ser. No. 15/592,120, titled "LED Design Language for Visual Affordance of Voice User Interfaces," which is incorporated herein by reference. In addition, an electronic device included in the environment 100 can be configured with movement sensors that can detect movement of objects and people in proximity to the electronic device, such as a radar transceiver(s) or PIR detector(s), as described in U.S. patent application Ser. No. 15/481,289, titled "Systems, Methods, and Devices for Utilizing Radar-Based Touch Interfaces," which is incorporated herein by reference.

Inputs received by any of these sensors can be processed by the electronic device and/or by a server communicatively coupled with the electronic device (e.g., the server system 140 of FIG. 1A). In some implementations, the electronic device and/or the server processes and/or prepares a response to the user's input(s), which response is output by the electronic device via one or more of the electronic device's output capabilities. In some implementations, the electronic device outputs via one or more of the electronic device's output capabilities information that is not directly responsive to a user input, but which is transmitted to the electronic device by a second electronic device in the environment 100, or by a server communicatively coupled with the electronic device. This transmitted information can be of any type that is displayable/playable by the output capabilities of the electronic device.

The server system 140 provides data processing for monitoring and facilitating review of events (e.g., motion, audio, security, etc.) from data captured by the devices included in the environment 100, such as video cameras 132, doorbells 126 (with embedded cameras), and electronic assistant devices 190. In some implementations, the server system 140 may include a voice/display assistance server 112 that processes video and/or audio inputs (e.g., collected by electronic assistant devices 190, doorbell/cameras 126, or video cameras 132), one or more content hosts 114 that provide media content for display on one or more of the devices included in the environment 100, and a cloud cast service server 116 creating a virtual user domain based on distributed device terminals. In some implementations, the server system 140 also includes a device registry 118 for keeping a record of the distributed device terminals in the virtual user environment. Examples of the distributed device terminals include, but are not limited to the electronic assistant devices 190, cast devices 108, media output devices 106, and/or any other device included in the environment 100. In some implementations, these distributed device terminals are linked to a user account in the virtual user domain. In some implementations, each of these functionalities and content hosts is a distinct server within the server system 140. In some implementations, a subset of these functionalities is integrated within the server system 140.

In some implementations, the network interface 160 includes a conventional network device (e.g., a router). In some implementations, the environment 100 further includes a hub device 180 that is communicatively coupled to the network(s) 110 directly or via the network interface 160. The hub device 180 is further communicatively coupled to one or more of the devices included in the environment 100. In some implementations, one or more of the network connected devices included in the environment 100 optionally communicates with the hub device 180 using one or more radio communication networks (e.g., ZigBee, Z-Wave, Insteon, Bluetooth, Wi-Fi and/or other radio communication networks). In some implementations, the hub device 180 and devices coupled with/to the hub device 180 can be controlled or otherwise interacted with via an application running on a client device 104 (e.g., a mobile phone, household controller, laptop, tablet computer, game console, or similar electronic device). In some implementations, a user of such an application can view status information of the hub device or coupled network connected devices, configure the hub device to interoperate with devices newly introduced to the home network, commission new devices, adjust or view settings of connected devices, and so forth.

Figure 1B:
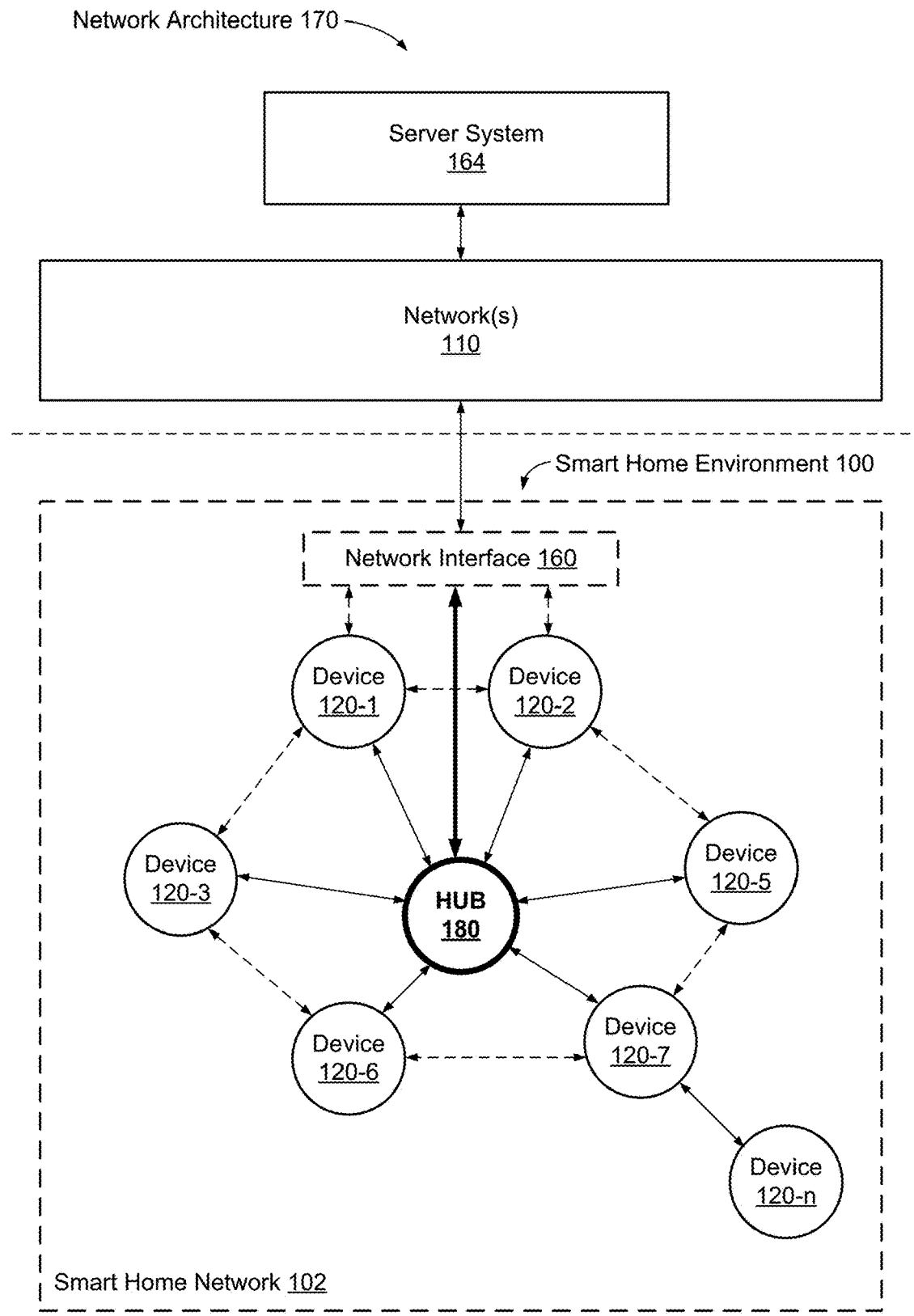
FIG. 1B is a block diagram illustrating a representative network architecture in accordance with some implementations.

FIG. 1B is a block diagram illustrating a representative network architecture 170 that includes a network 102 in accordance with some implementations.

In some implementations, the integrated devices of the environment 100 include intelligent, multi-sensing, network-connected devices (e.g., devices 122, 124, 126, 128, 130, 132, 136 and/or 138), herein referred to collectively as devices 120, that integrate seamlessly with each other in a network (e.g., 102 FIG. 1B) and/or with a central server or a cloud-computing system (e.g., server system 164) to provide a variety of useful functions.

In some implementations, the devices 120 in the environment 100 combine with the hub device 180 to create a mesh network in network 102. In some implementations, one or more devices 120 in the network 102 operate as a controller. Additionally and/or alternatively, the hub device 180 operates as the controller. In some implementations, a controller has more computing power than other devices. In some implementations, a controller processes inputs (e.g., from devices 120, electronic devices 190 (FIG. 1A), and/or server system 164) and sends commands (e.g., to devices 120 in the network 102) to control operation of the environment 100. In some implementations, some of the devices 120 in the network 102 (e.g., in the mesh network) are "spokesman" nodes (e.g., 120-1) and others are "low-power" nodes (e.g., 120-6). Some of the devices in the environment 100 are battery powered, while others have a regular and reliable power source, such as by connecting to wiring (e.g., to 120 volt line voltage wires) behind the walls 154 of the environment. The devices that have a regular and reliable power source are referred to as "spokesman" nodes. These nodes are typically equipped with the capability of using a wireless protocol to facilitate bidirectional communication with a variety of other devices in the environment 100, as well as with the server system 164. In some implementations, one or more "spokesman" nodes operate as a controller. The devices that are battery powered are the "low-power" nodes. These low power nodes tend to be smaller than spokesman nodes and typically only communicate using wireless protocols that require very little power, such as Zigbee, ZWave, 6LoWPAN, Thread, Bluetooth, etc.

In some implementations, some low-power nodes are incapable of bidirectional communication. These low-power nodes send messages, but they are unable to "listen". Thus, other devices in the environment 100, such as the spokesman nodes, cannot send information to these low-power nodes. In some implementations, some low-power nodes are capable of only a limited bidirectional communication. For example, other devices are able to communicate with the low-power nodes only during a certain time period.

As described, in some implementations, the devices serve as low-power and spokesman nodes to create a mesh network in the environment 100. In some implementations, individual low-power nodes in the environment regularly send out messages regarding what they are sensing, and the other low-power nodes in the environment—in addition to sending out their own messages—forward the messages, thereby causing the messages to travel from node to node (i.e., device to device) throughout the network 102. In some implementations, the spokesman nodes in the network 102, which are able to communicate using a relatively high-power communication protocol, such as IEEE 802.11, are able to switch to a relatively low-power communication protocol, such as IEEE 802.15.4, to receive these messages, translate the messages to other communication protocols, and send the translated messages to other spokesman nodes and/or the server system 164 (using, e.g., the relatively high-power communication protocol). Thus, the low-power nodes using low-power communication protocols are able to send and/or receive messages across the entire network 102, as well as over the Internet 110 to the server system 164. In some implementations, the mesh network enables the server system 164 to regularly receive data from most or all of the devices in the home, make inferences based on the data, facilitate state synchronization across devices within and outside of the network 102, and send commands to one or more of the devices to perform tasks in the environment.

As described, the spokesman nodes and some of the low-power nodes are capable of "listening." Accordingly, users, other devices, and/or the server system 164 may communicate control commands to the low-power nodes. For example, a user may use the electronic device 104 (e.g., a phone or other mobile communication device) to send commands over the Internet to the server system 164, which then relays the commands to one or more spokesman nodes in the network 102. The spokesman nodes may use a low-power protocol to communicate the commands to the low-power nodes throughout the network 102, as well as to other spokesman nodes that did not receive the commands directly from the server system 164.

In some implementations, a nightlight 170 (FIG. 1A), which is an example of a device 120, is a low-power node. In addition to housing a light source, the nightlight 170 houses an occupancy sensor, such as an ultrasonic or passive IR sensor, and an ambient light sensor, such as a photo resistor or a single-pixel sensor that measures light in the room. In some implementations, the nightlight 170 is configured to activate the light source when its ambient light sensor detects that the room is dark and when its occupancy sensor detects that someone is in the room. In other implementations, the nightlight 170 is simply configured to activate the light source when its ambient light sensor detects that the room is dark. Further, in some implementations, the nightlight 170 includes a low-power wireless communication chip (e.g., a ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly (e.g., using the mesh network) from node to node (i.e., device to device) within the network 102 as well as over the Internet 110 to the server system 164.

Other examples of low-power nodes include battery-powered versions of the hazard detectors 124, cameras 132, doorbells 126, and the like. These battery-powered devices are often located in an area without access to constant and reliable power and optionally include any number and type of sensors, such as image sensor(s), occupancy/motion sensors, ambient light sensors, ambient temperature sensors, humidity sensors, smoke/fire/heat sensors (e.g., thermal radiation sensors), carbon monoxide/dioxidesensors, and the like. Furthermore, battery-powered devices may send messages that correspond to each of the respective sensors to the other devices and/or the server system 164, such as by using the mesh network as described above.

Examples of spokesman nodes include line-powered doorbells 126, thermostats 122, wall switches 136, and wall plugs 142. These devices are located near, and connected to, a reliable power source, and therefore may include more power-consuming components, such as one or more communication chips capable of bidirectional communication in a variety of protocols.

In some implementations, the environment 100 includes service robots 168 (FIG. 1A) that are configured to carry out, in an autonomous manner, certain household tasks.

As explained above with reference to FIGS. 1A-1B, in some implementations, the environment 100 of FIGS. 1A-1B includes a hub device 180 that is communicatively coupled to the network(s) 110 directly or via the network interface 160. The hub device 180 is further communicatively coupled to one or more of the devices using a radio communication network that is available at least in the environment 100. Communication protocols used by the radio communication network include, but are not limited to, ZigBee, Z-Wave, Insteon, EuOcean, Thread, OSIAN, Bluetooth Low Energy and the like. In some implementations, the hub device 180 not only converts the data received from each device to meet the data format requirements of the network interface 160 or the network(s) 110, but also converts information received from the network interface 160 or the network(s) 110 to meet the data format requirements of the respective communication protocol associated with a targeted device. In some implementations, in addition to data format conversion, the hub device 180 further processes the data received from the devices or information received from the network interface 160 or the network(s) 110 preliminary. For example, the hub device 180 can integrate inputs from multiple sensors/connected devices (including sensors/devices of the same and/or different types), perform higher level processing on those inputs— e.g., to assess the overall environment and coordinate operation among the different sensors/devices—and/or provide instructions to the different devices based on the collection of inputs and programmed processing. It is also noted that in some implementations, the network interface 160 and the hub device 180 are integrated to one network device. Functionality described herein is representative of particular implementations of devices, control application(s) running on representative electronic device(s) (such as a phone or other mobile communication device), hub device(s) 180, and server(s) coupled to hub device(s) via the Internet or other Wide Area Network. All or a portion of this functionality and associated operations can be performed by any elements of the described system—for example, all or a portion of the functionality described herein as being performed by an implementation of the hub device can be performed, in different system implementations, in whole or in part on the server, one or more connected devices and/or the control application, or different combinations thereof.

Figure 2:
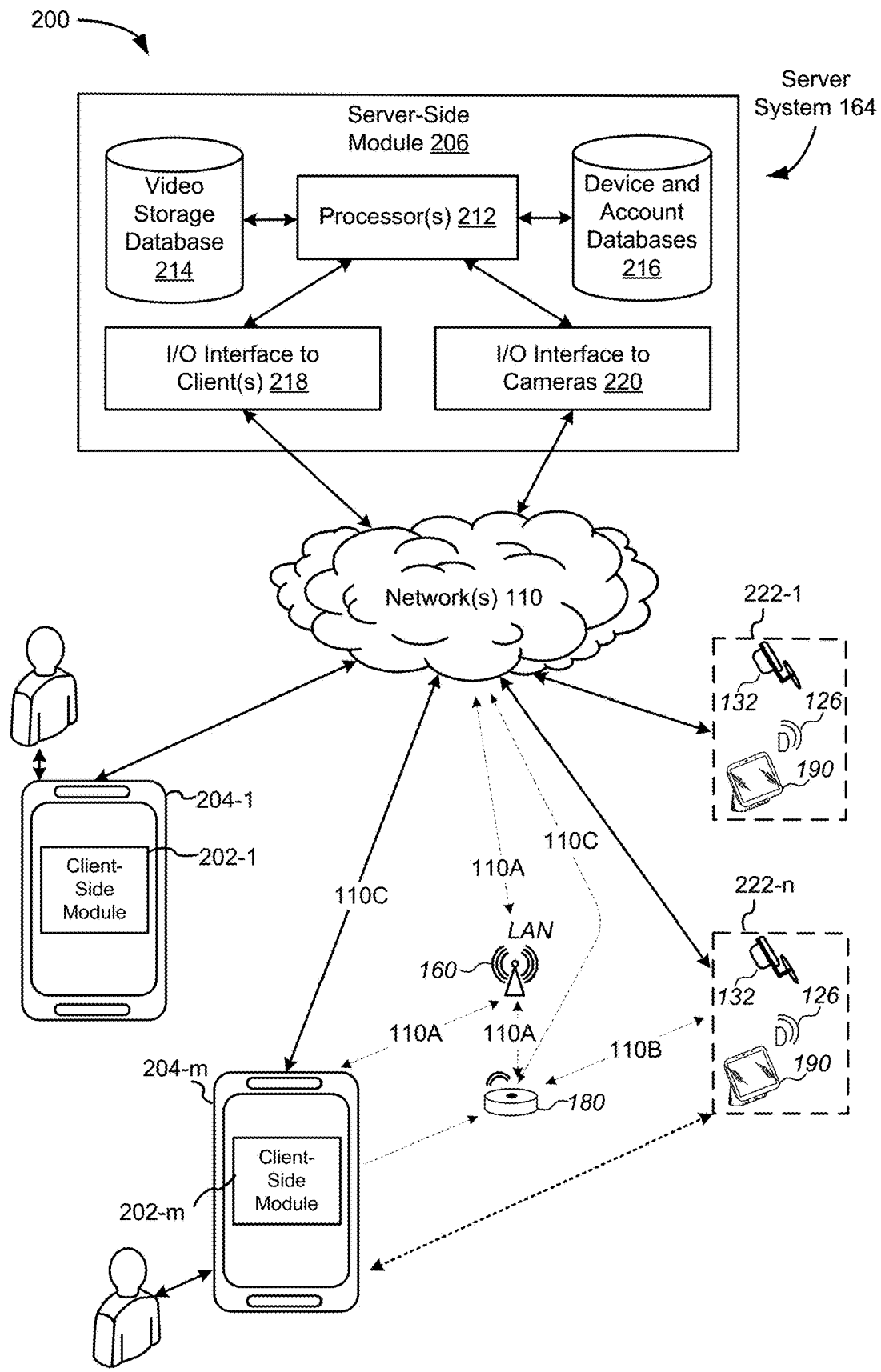
FIG. 2 is a block diagram of an example operating environment in accordance with some implementations.

FIG. 2 illustrates a representative operating environment 200 in which a server system 164 (also sometimes called a "hub device server system," "video server system," or "hub server system") provides data processing for monitoring and facilitating review of motion events in video streams captured by video cameras 132. As shown in FIG. 2, the server system 164 receives video data from video sources 222 (including camera(s) 132, doorbell(s) 126, and/or electronic device(s) 190) located at various physical locations (e.g., inside homes, restaurants, stores, streets, parking lots, and/or the environments 100 of FIG. 1). Each video source 222 may be bound to one or more reviewer accounts, and the server system 164 provides video monitoring data for the video source 222 to client devices 204 associated with the reviewer accounts. For example, the portable electronic device 104 is an example of the client device 204.

In some implementations, the provider server system 164 or a component thereof corresponds to the server system described with reference to FIGS. 1A-1B. In some implementations, the server system 164 is a dedicated video processing server or includes dedicated video processing components that provide video processing services to video sources and client devices 204 independent of other services provided by the server system as described with reference to FIGS. 1A-1B.

In some implementations, each of the video sources 222 includes one or more video cameras 132 that capture video and send the captured video to the server system 164 substantially in real-time, or on a clip-by-clip basis (described in more detail below with reference to events and video clips). In some implementations, one or more of the video sources 222 optionally includes a controller device (not shown) that serves as an intermediary between the one or more cameras 132 and the server system 164. The controller device receives the video data from the one or more cameras 132, optionally, performs some preliminary processing on the video data, and sends the video data to the server system 164 on behalf of the one or more cameras 132 substantially in real-time. In some implementations, each camera has its own on-board processing capabilities to perform some preliminary processing on the captured video data before sending the processed video data (along with metadata obtained through the preliminary processing) to the controller device and/or the server system 164. Throughout this disclosure implementations are described with reference to a video camera 132 as the video source 222. However, each implementation also applies to any other camera-equipped device in the environment 100, such as a doorbell 126 or an assistant device 190 with camera included.

As shown in FIG. 2, in accordance with some implementations, each of the client devices 204 includes a client-side module 202. The client-side module 202 communicates with a server-side module 206 executed on the server system 164 through the one or more networks 110. The client-side module 202 provides client-side functionalities for the event monitoring and review processing and communications with the server-side module 206. The server-side module 206 provides server-side functionalities for event monitoring and review processing for any number of client-side modules 202 each residing on a respective client device 204. The server-side module 206 also provides server-side functionalities for video processing and camera control for any number of the video sources 222, including any number of control devices and the cameras 132.

In some implementations, the server-side module 206 includes one or more processors 212, a video storage database 214, device and account databases 216, an I/O interface to one or more client devices 218, and an I/O interface to one or more video sources 222. The I/O interface to one or more clients facilitates the client-facing input and output processing for the server-side module 206. The databases 216 store a plurality of profiles for reviewer accounts registered with the video processing server, where a respective user profile includes account credentials for a respective reviewer account, and one or more video sources linked to the respective reviewer account. The I/O interface to one or more video sources 222 facilitates communications with one or more video sources 222 (e.g., groups of one or more cameras 132 and associated controller devices). The video storage database 214 stores raw video data received from the video sources 222, as well as various types of metadata, such as motion events, event categories, event category models, event filters, and event masks, for use in data processing for event monitoring and review for each reviewer account.

Examples of a representative client device 204 include, but are not limited to, a handheld computer, a wearable computing device, a personal digital assistant (PDA), a tablet computer, a laptop computer, a desktop computer, a cellular telephone, a mobile phone, a media player, a navigation device, a game console, a television, a remote control, a point-of-sale (POS) terminal, vehicle-mounted computer, an ebook reader, or a combination of any two or more of these data processing devices or other data processing devices.

Examples of the one or more networks 110 include local area networks (LAN) and wide area networks (WAN) such as the Internet. The one or more networks 110 are, optionally, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

In some implementations, the server system 164 is implemented on one or more standalone data processing apparatuses or a distributed network of computers. In some implementations, the server system 164 also employs various virtual devices and/or services of third party service providers (e.g., third-party cloud service providers) to provide the underlying computing resources and/or infrastructure resources of the server system 164. In some implementations, the server system 164 includes, but is not limited to, a handheld computer, a tablet computer, a laptop computer, a desktop computer, or a combination of any two or more of these data processing devices, or other data processing devices.

The server-client environment 200 shown in FIG. 2 includes both a client-side portion (e.g., the client-side module 202) and a server-side portion (e.g., the server-side module 206). The division of functionalities between the client and server portions of operating environment 200 can vary in different implementations. Similarly, the division of functionalities between the video source 222 and the server system 164 can vary in different implementations. For example, in some implementations, client-side module 202 is a thin-client that provides only user-facing input and output processing functions, and delegates all other data processing functionalities to a backend server (e.g., the server system 164). Similarly, in some implementations, a respective one of the video sources 222 is a simple video capturing device that captures and streams video data (e.g., events in the form of videoclips) to the server system 164 with no or limited local preliminary processing on the video data. Although many aspects of the present technology are described from the perspective of the server system 164, the corresponding actions performed by the client device 204 and/or the video sources 222 would be apparent to ones skilled in the art without any creative efforts. Similarly, some aspects of the present technology may be described from the perspective of the client device or the video source, and the corresponding actions performed by the video server would be apparent to ones skilled in the art without any creative efforts. Furthermore, some aspects of the present technology may be performed by the server system 164, the client device 204, and the video sources 222 cooperatively.

It should be understood that operating environment 200 that involves the server system 164, the video sources 222 and the video cameras 132 is merely an example. Many aspects of operating environment 200 are generally applicable in other operating environments in which a server system provides data processing for monitoring and facilitating review of data captured by other types of electronic devices (e.g., thermostats 122, hazard detectors 124, doorbells 126, wall plugs 142, appliances 138, and the like).

The electronic devices, the client devices, and the server system communicate with each other using the one or more communication networks 110. In an example environment, two or more devices (e.g., the network interface device 160, the hub device 180, and the client devices 204-m) are located in close proximity to each other, such that they could be communicatively coupled in the same sub-network 110A via wired connections, a WLAN or a Bluetooth Personal Area Network (PAN). The Bluetooth PAN is optionally established based on classical Bluetooth technology or Bluetooth Low Energy (BLE) technology. This environment further includes one or more other radio communication networks 110B through which at least some of the electronic devices of the video sources 222-n exchange data with the hub device 180. Alternatively, in some situations, some of the electronic devices of the video sources 222-n communicate with the network interface device 160 directly via the same sub-network 110A that couples devices 160, 180 and 204-m. In some implementations (e.g., in the network 110C), both the client device 204-m and the electronic devices of the video sources 222-n communicate directly via the network(s) 110 without passing the network interface device 160 or the hub device 180.

In some implementations, during normal operation, the network interface device 160 and the hub device 180 communicate with each other to form a network gateway through which data are exchanged with the electronic device of the video sources 222-n. As explained above, the network interface device 160 and the hub device 180 optionally communicate with each other via a sub-network 110A.

Figure 3:
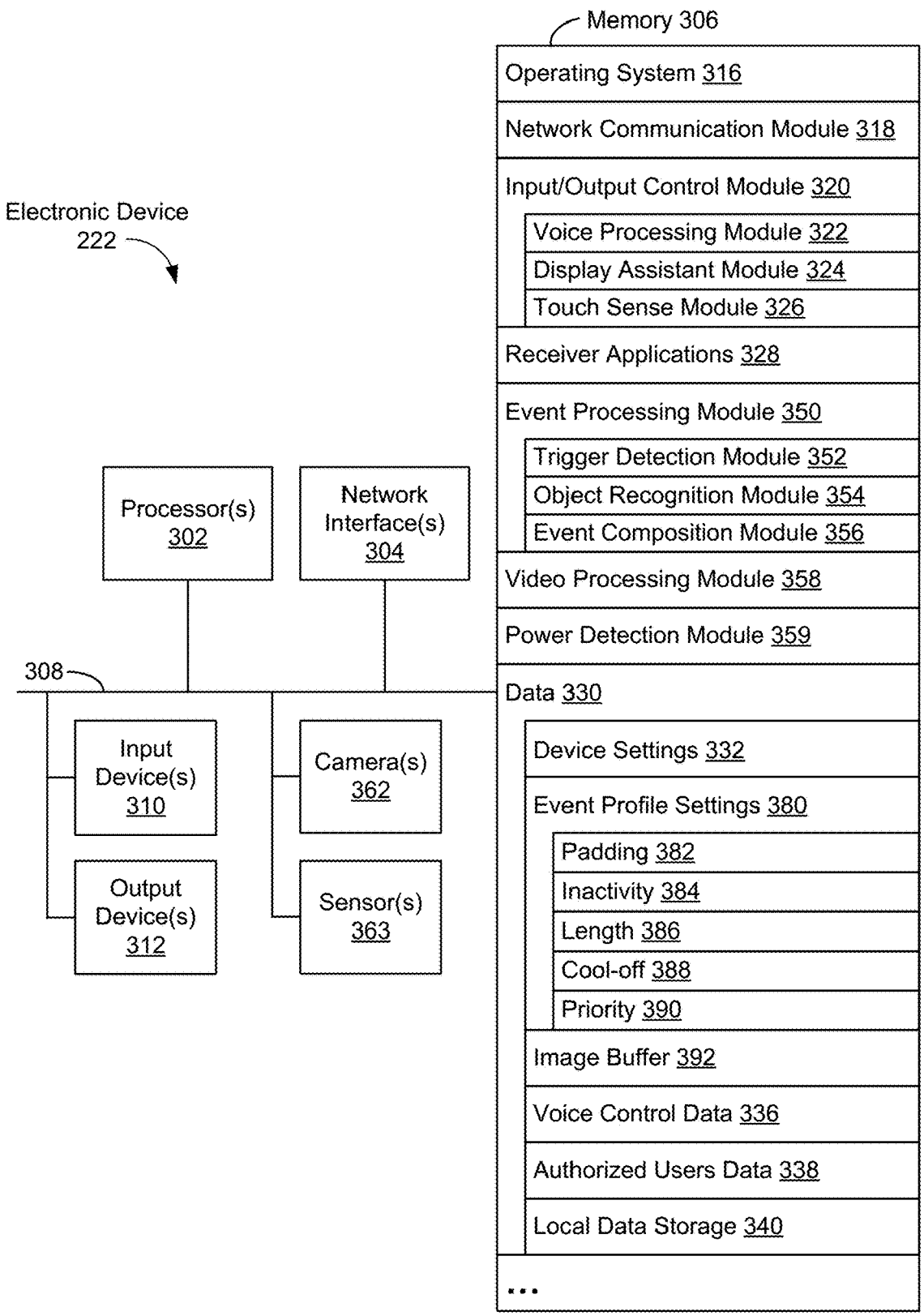
FIG. 3 is a block diagram illustrating an example electronic device in accordance with some implementations.

FIG. 3 is a block diagram illustrating an example electronic device 222 in an environment 100 in accordance with some implementations. For example, the electronic device 222 may be a security camera 132, a doorbell camera 126, or an assistant device with camera 190. The electronic device 222 typically includes one or more processors (CPUs) 302, one or more network interfaces 304, memory 306, and one or more communication buses 308 for interconnecting these components (sometimes called a chipset). The electronic device 222 includes one or more camera(s) 362 that are configured to capture images and/or video. The electronic device 222 includes one or more output devices 312, including one or more speakers, a display, and/or one or more indicator light(s) (e.g., LEDs) that are configured to display a visual indication of the status of the camera(s) 362. In some implementations, the electronic device 222 also includes sensor(s) 363 (such as a motion sensor, radar sensor, and/or a presence sensor) that detect events or changes. In some implementations, detection of the events or changes is triggered by detection of motion in the field of view of the camera 362.

In some implementations of the electronic device 222 (e.g., assistant device 190), the electronic device 222 also includes one or more input devices 310 that facilitate user input, including one or more microphones, a volume control and a privacy control. The volume control is configured to receive a user action (e.g., a press on a volume up button or a volume down button, a press on both volumes up and down buttons for an extended length of time) that controls a volume level of the speakers or resets the display assistant device 300. The privacy control is configured to receive a user action that controls privacy settings of the display assistant device (e.g., whether to deactivate the microphones and/or the cameras 362). In some implementations, the privacy control is a physical button located on the electronic device 222. In some implementations, the input devices 310 of the electronic device 222 include a touch detection module that is integrated on the display panel and configured to detect touch inputs on its surface. In some implementations, the input devices 310 of the electronic device 222 include a camera module configured to capture images and/or a video stream of a field of view.

In some implementations, the electronic device 222 includes a presence sensor 363 configured to detect a presence of a user in a predetermined area surrounding the display assistant device 190. Under some circumstances, the display assistant device 190 operates at a sleep or hibernation mode that deactivates detection and processing of audio inputs, and does not wake up from the sleep or hibernation mode or listen to the ambient (i.e., processing audio signals collected from the ambient) until the presence sensor detects a presence of a user in the predetermined area. An example of the presence sensor is an ultrasonic sensor configured to detect a presence of a user.

Figure 8:
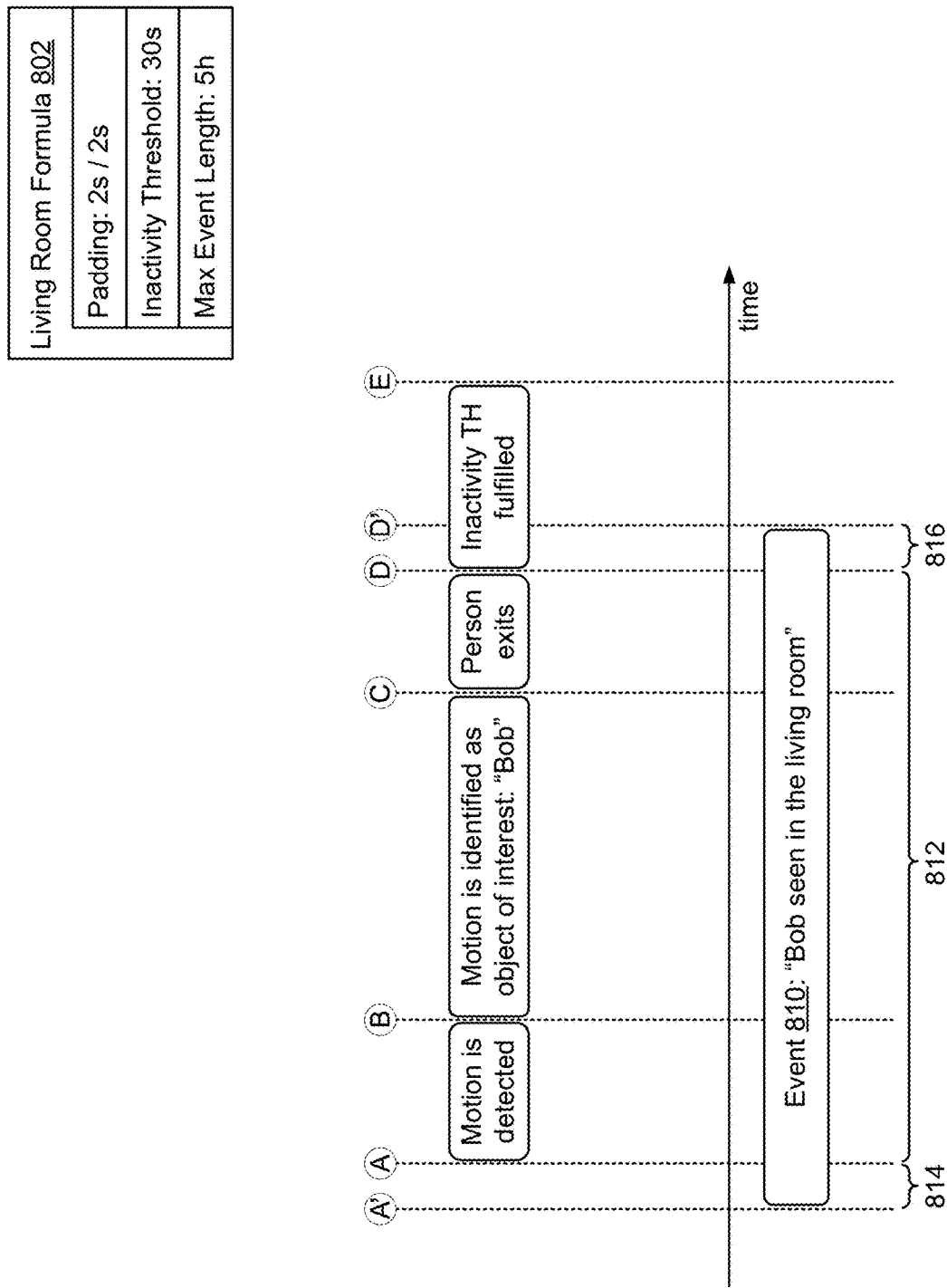
FIG. 8 is a diagram illustrating an example event in accordance with some implementations.
Figure 9:
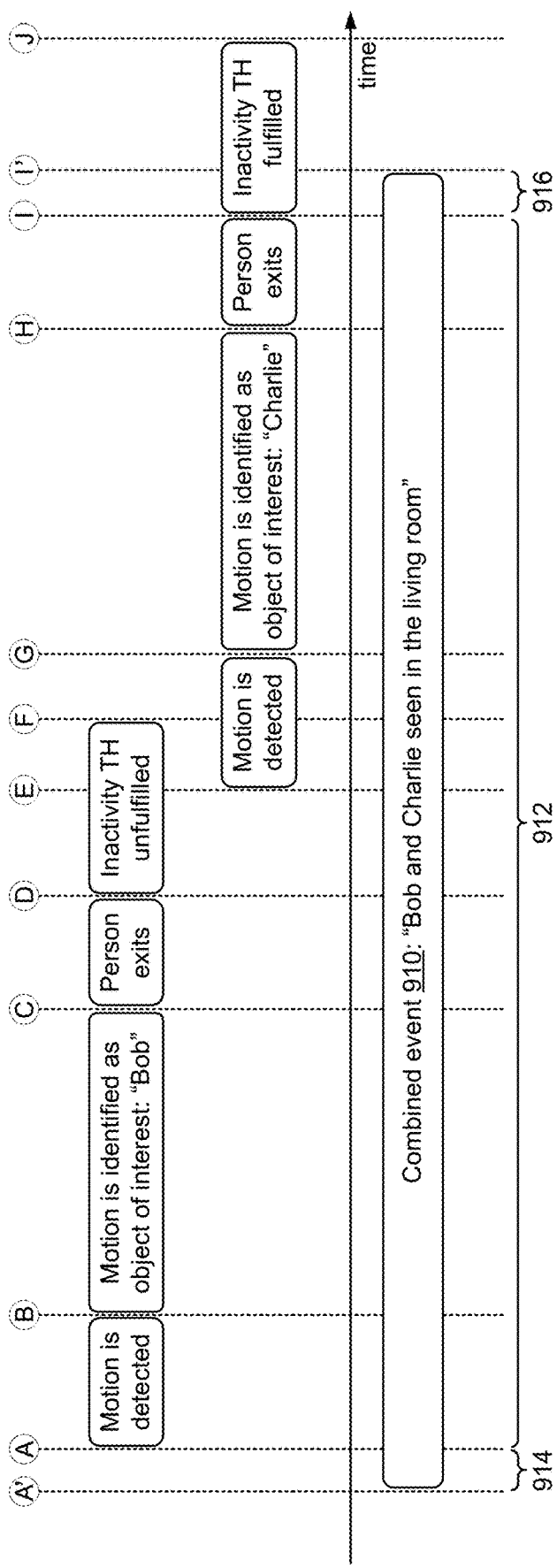
FIG. 9 is a diagram illustrating an example combined event in accordance with some implementations.

Memory 306 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 306, optionally, includes one or more storage devices remotely located from one or more processors 302 (or CPU(s)). Memory 306, or alternatively the non-volatile memory within memory 306, includes a non-transitory computer readable storage medium. In some implementations, memory 306, or the non-transitory computer readable storage medium of memory 306, stores the following programs, modules, and data structures, or a subset or superset thereof:

- Operating system 316 including procedures for handling various basic system services and for performing hardware dependent tasks;
- Network communication module 318 for connecting the electronic device 222 to other devices (e.g., the server system 164, the client device 104, client devices 204, the devices 120, the hub device 180, and/or other electronic devices 222) via one or more network interfaces 304 (wired or wireless) and one or more networks 110, such as the Internet, other wide area networks, local area networks, metropolitan area networks, and so on;
- Input/output control module 320 for receiving inputs via one or more input devices 310 enabling presentation of information at a display, including:
  - Voice processing module 322 for processing audio inputs or voice messages collected in an environment surrounding the electronic device 222, or preparing the collected audio inputs or voice messages for processing at the server system 164 (a voice/display assistance server 112);
  - Display assistant module 324 for displaying additional visual information including but not limited to a media content item (e.g., a YouTube video clip), news post, social media message, weather information, personal picture, a state of audio input processing, and readings of devices; and
  - Touch sense module 326 for sensing touch events on a top surface of the electronic device 222;
- Event processing module 350 for detecting an event and processing a video clip associated with the event, including:
  - Trigger detection module 350 for detecting an event trigger (e.g., motion in the scene or presence of a foreground object);
  - Object recognition module 354 for performing object recognition analysis on a detected object in the scene (e.g., as part of a determination as to whether the object should trigger creation of an event); and
  - Event composition module 356 for composing a video clip comprising frames including the event and/or additional frames before and/or after the event, wherein the composing includes accounting for event parameters such as inactivity thresholds and maximum event length;
- Video processing module 358 for capturing image frames from an image sensor of the camera 362 and processing video streams (e.g., a continuous video stream, a video clip, and/or one or more still images), wherein the processing includes, in some implementations, compressing the processed video data for transmission over a network;
- Power detection module 359 for detecting a power type of the electronic device 222 (e.g., whether the device is powered by a battery or powered by a wired power source);
- Data 330 including:
  - Device settings 332 for storing information associated with the electronic device 222 itself, including common device settings (e.g., service tier, device model, storage capacity, processing capabilities, communication capabilities, etc.) and information of a user account in a virtual user domain to which the electronic device 222 is linked;
  - Event profile settings 380 including parameters used by the event processing module 350 for creating events, such as:
    - padding 382, including a pre-roll value (e.g., the amount of time to include in an event clip before detection of an object or occurrence of interest, or a number of obtained images preceding the image frames which include the object or occurrence of interest; see, e.g., padding windows 814 and 914 in FIGS. 8 and 9); and a post-roll value (e.g., the amount of time to include in an event clip after the detected object or occurrence of interest is no longer in the scene or field of view of the camera; or a number of obtained images in which the object or occurrence of interest is no longer detected; see, e.g., padding windows 816 and 916 in FIGS. 8 and 9)
    - inactivity threshold 384 (e.g., the amount of time to wait before ending an event instead of continuing the event to include subsequent activity, or a number of obtained image frames in which the object or occurrence of interest is no longer detected, where the number corresponds to the amount of time to wait before ending the event; see, e.g., the inactivity windows between times D/E in FIG. 8 and between times D/F and I/J in FIG. 9),
    - maximum event length 386 (e.g., how long the event may last before the event ends, regardless of whether the object or occurrence of interest is still present in the scene or field of view of the camera, or a maximum number of images associated with an amount of time specified as being the maximum event length; see, e.g., event segments 812 and 912 in FIGS. 8 and 9; in some implementations, the maximum event length includes the padding windows; in some implementations, the maximum event length does not include the padding windows),
    - cool-off threshold 388 (e.g., a rate of object detections above which the recording of an event ceases), and/or
    - object filters and/or priority 390 (e.g., for determining which objects may count as a basis for recording an event; see, e.g., the event priority lists in example formulas 442 in FIG. 5);
  - Image buffer 392 (also referred to as an input buffer) for storing image frames captured by an image sensor of the camera 362;
  - Voice control data 336 for storing audio signals, voice messages, response messages and other data related to voice interface functions of the electronic device 222;
  - Authorized users data 338 for storing information of users authorized to use the display assistant device, including images, voice information, fingerprint information of the authorized users; and
  - Local data storage 340 for selectively storing raw or processed data associated with the electronic device 222, such as event data and/or video data captured by the camera(s) 362;

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 306, optionally, stores a subset of the modules and data structures identified above. Furthermore, memory 306, optionally, stores additional modules and data structures not described above.

In some implementations, one or more of the above identified elements may be stored or otherwise implemented at a server system (e.g., server system 164). For instance, the event processing module 350 may be stored at the server system 164. For such implementations, the electronic device 222 would transmit a video stream including image data obtained from a camera 362 to the server system 164, and the event processing module 350 would perform trigger detection, object recognition, and/or event composition at the server system 164. As a result of one or more of the aforementioned processes, an event clip (e.g., event clip 740, described in more detail below with regard to FIG. 7) would be transmitted from the server system 164 to the electronic device 222 and displayed (e.g., at an output device 312 of the electronic device 222).

Figure 4:
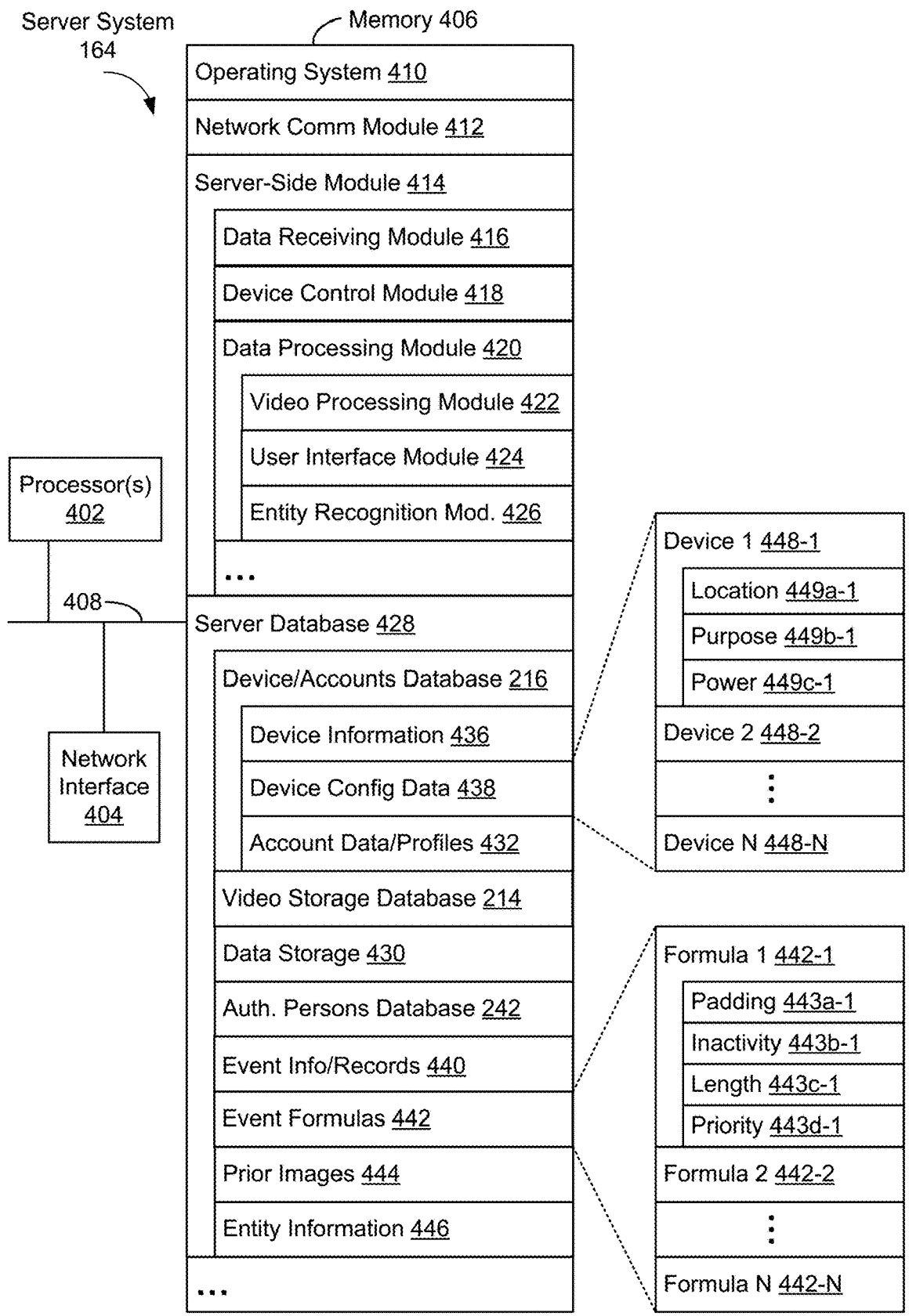
FIG. 4 is a block diagram illustrating a representative server system in accordance with some implementations.

FIG. 4 is a block diagram illustrating the server system 164 in accordance with some implementations. The server system 164 includes one or more processor(s) (e.g., CPUs) 402, one or more network interfaces 404, memory 406, and one or more communication buses 408 for interconnecting these components (sometimes called a chipset). The memory 406 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 406, optionally, includes one or more storage devices remotely located from one or more processor(s) 402. The memory 406, or alternatively the non-volatile memory within memory 406, includes a non-transitory computer-readable storage medium. In some implementations, the memory 406, or the non-transitory computer-readable storage medium of the memory 406, stores the following programs, modules, and data structures, or a subset or superset thereof:

- an operating system 410 including procedures for handling various basic system services and for performing hardware dependent tasks;
- a network communication module 412 for connecting the server system 164 to other systems and devices (e.g., client devices, electronic devices, and systems connected to one or more networks 110) via one or more network interfaces 404 (wired or wireless);
- a server-side module 414, which provides server-side functionalities for device control, data processing, and data review, including, but not limited to:
  - a data receiving module 416 for receiving data from electronic devices (e.g., event data from an electronic device 222), and preparing the received data for further processing and storage in the server database 428;
  - a device control module 418 for generating and sending server-initiated control commands to modify operation modes of electronic devices (e.g., electronic devices 222), and/or receiving (e.g., from client devices 204 and client device 104) and forwarding user-initiated control commands to modify operation modes of the electronic devices (e.g., receiving device configuration data 438 for an electronic device 222 and forwarding one or more event processing formulas 442 corresponding to the configuration data 438);
  - a data processing module 420 for processing the data provided by the electronic devices, and/or preparing and sending processed data to a device for review (e.g., client devices 204 for review by a user), including, but not limited to:
    - a video processing module 422 for processing (e.g., categorizing and/or recognizing) detected entities and/or event candidates within a received video clip (e.g., a video clip from the electronic device 222 corresponding to a detected event);
    - a user interface module 424 for communicating with a user (e.g., sending alerts, timeline events, etc. and receiving user edits and zone definitions and the like); and
    - an entity recognition module 426 for analyzing and/or identifying persons detected within environments;
- a server database 428, including but not limited to:
  - a devices and accounts database 216 for storing devices and accounts data including:
    - device information 436 related to one or more devices (e.g., electronic devices 222);
    - device configuration data 438, including device identifiers 448, installation location data 449a, device purpose information 449b, and/or device power type data 449c;
    - account data 432 for user accounts, including user account information such as user profiles, information and settings for linked hub devices and electronic devices (e.g., hub device identifications), hub device specific secrets, relevant user and hardware characteristics (e.g., service tier, subscriptions, device model, storage capacity, processing capabilities, etc.), user interface settings, data review preferences, etc., where the information for associated electronic devices includes, but is not limited to, one or more device identifiers (e.g., MAC address and UUID), device specific secrets, and displayed titles; profiles for reviewer accounts registered with the video processing server, where a respective user profile includes account credentials for a respective reviewer account, and one or more video sources linked to the respective reviewer account;
  - a video storage database 214 (see FIG. 2) for storing video data received from the video sources (e.g., video clips received from one or more electronic devices 222), as well as various types of event metadata, such as motion events, event categories, event category models, event filters, and event masks, for use in data processing for event monitoring and review for each reviewer account;
  - a data storage 430 for storing data associated with each electronic device (e.g., each electronic device 222) of each user account, as well as data processing models, processed data results, and other relevant metadata (e.g., names of data results, location of electronic device, creation time, duration, settings of the electronic device, etc.) associated with the data, where (optionally) all or apportion of the data and/or processing associated with the hub device 180 or devices are stored securely;

an authorized persons database 242 for storing information of authorized users for electronic devices (e.g., the electronic devices 222), including images, voiceprints, fingerprints, confidence levels and the like;

event information 440 such as event records and context information (e.g., contextual data describing circumstances surrounding an approaching visitor);

event formulas 442 including predetermined or otherwise preprogrammed formulas (also referred to herein as recipes) of event parameters corresponding to specific configuration settings 438, including particular combinations of padding values 443*a*, inactivity values 443*b*, length values 443*c*, cool-off values, and/or priority values 443*d*;

prior images 444 such as prior background images and/or entity images captured by camera(s) in various lighting conditions; and entity information 446 such as information identifying and/or characterizing entities (e.g., in the environment 100).

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise rearranged in various implementations. In some implementations, the memory 406, optionally, stores a subset of the modules and data structures identified above. Furthermore, the memory 406, optionally, stores additional modules and data structures not described above (e.g., an account management module for linking client devices, devices, and environments).

In some implementations, the memory 406 includes a voice/display assistant application (not shown) that is executed to arrange voice processing of a voice message received from a voice-activated electronic device 190, directly process the voice message to extract a user voice command and a designation of a cast device 108 or another voice-activated electronic device 190, and/or enable a voice-activated electronic device 190 to play media content (audio or video)

In some implementations, the server system 164 includes cloud cast service (e.g., the cloud cast server 116, FIG. 1A). In some implementations, the memory 406 further includes a cast device application that is executed to provide server-side functionalities for device provisioning, device control, and user account management associated with cast device(s) 108. Further details of the cloud cast functionalities are found in PCT Application No. PCT/US2015/64449, filed Dec. 7, 2019, entitled "Display Assistant Device," which is incorporated herein by reference in its entirety.

FIG. 5 includes two example event formulas (e.g., formulas 442, FIG. 4) in accordance with some implementations.

An outdoor formula 502 is for use with electronic devices 222 located in an outdoor setting (e.g., an outdoor security camera or a doorbell camera). In the outdoor formula 502, events are padded by two seconds of video before the initial event trigger (e.g., before motion is initially detected, or before an object of interest is recognized as having entered the scene), and two seconds of video after the event is completed (e.g., after no more motion is detected). The padding values are sometimes referred to herein as pre-roll and post-roll values. The inactivity threshold is 30 seconds, and the maximum event length is 5 hours. Further, the outdoor formula includes a list of objects/events of interest and their priorities. In some implementations, if two objects/events are detected at the same time at a particular portion of the event, that portion of the event is labeled using the higher priority object/event. In some implementations, only objects/events having a priority higher than a threshold are used as a basis for creating an event and/or sending a notification to a client device.

An indoor formula 504 is for use with electronic devices 222 located in an indoor setting (e.g., an indoor security camera or a camera-equipped assistant device). In this example, events occurring indoors are given extra post-roll padding time (5 seconds, versus only 2 seconds in the outdoor formula). The inactivity threshold remains 30 seconds, but the maximum event length is only 1 hour. In addition, the event priority list prioritizes objects/events, such as pets, knocking, glass breaking, and babies crying higher than those objects/events are priorities in the outdoor formula 502, since these events are more likely to occur, and are therefore more relevant, in an indoor setting.

The formulas 502 and 504 are examples. Other combinations of values, as well as other device locations and configurations may be implemented in event formulas without departing from the scope of the concepts described herein. In some implementations, the formulas 442 may include baseline parameter values (such as those included in the examples in FIG. 5) which are configured to change based on updated configuration data, user preferences, and/or device learning algorithms as described below.

Figure 6:
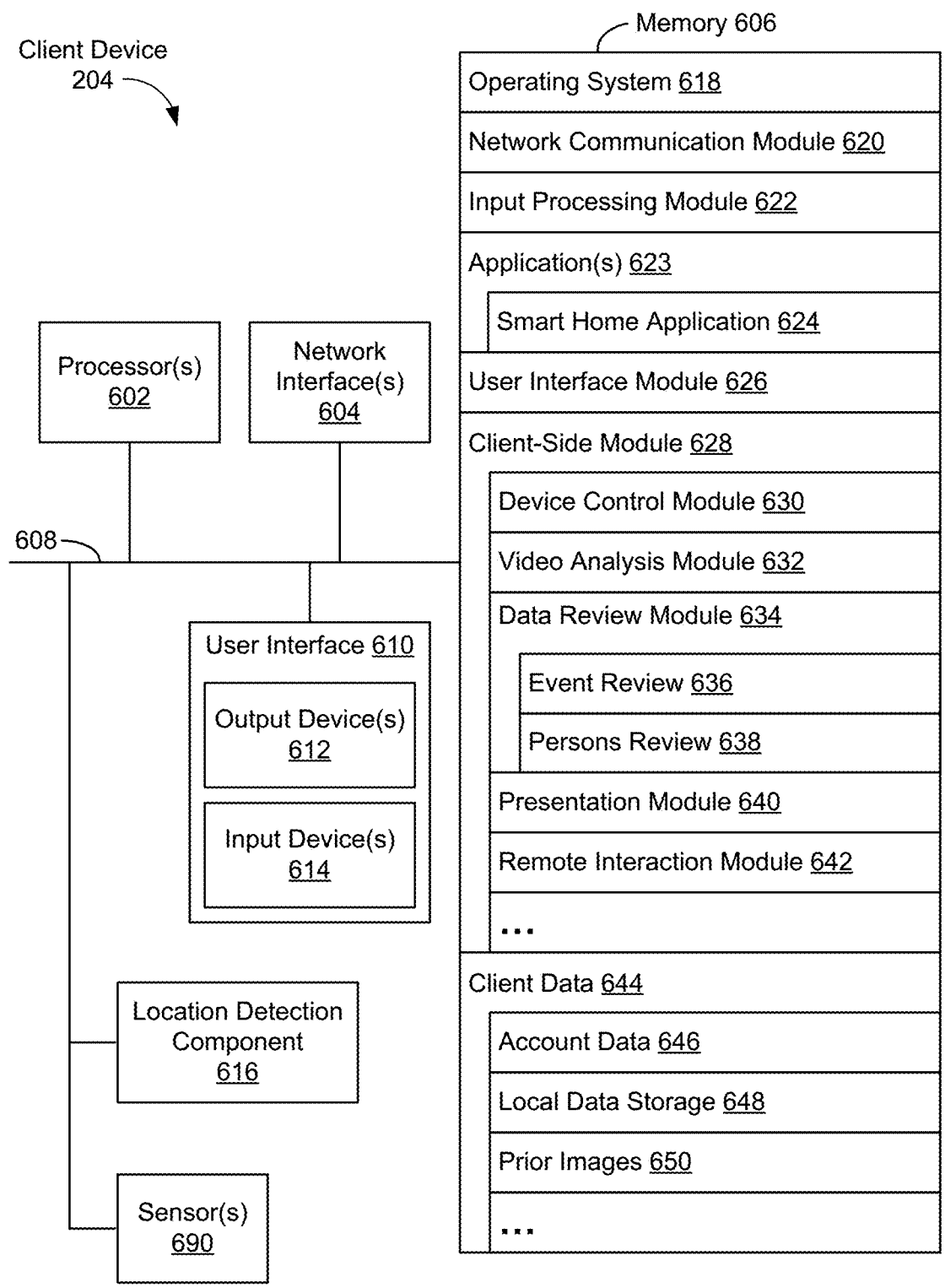
FIG. 6 is a block diagram illustrating a representative client device in accordance with some implementations.

FIG. 6 is a block diagram illustrating a representative client device 204 (client devices 204 in FIG. 2 and the client device 104 in FIG. 1) associated with a user account in accordance with some implementations. The client device 204, typically, includes one or more processors (e.g., CPUs) 602, one or more network interfaces 604, memory 606, and one or more communication buses 608 for interconnecting these components (sometimes called a chipset). Optionally, the client device also includes a user interface 610 and one or more sensors 690 (e.g., accelerometer and gyroscope). The user interface 610 includes one or more output devices 612 that enable presentation of media content, including one or more speakers and/or one or more visual displays. The user interface 610 also includes one or more input devices 614, including user interface components that facilitate user input such as a keyboard, a mouse, a voice-command input unit or microphone, a touch screen display, a touch-sensitive input pad, a gesture capturing camera, or other input buttons or controls. Furthermore, some the client devices use a microphone and voice recognition or a camera and gesture recognition to supplement or replace the keyboard. In some implementations, the client device includes one or more cameras, scanners, or photo sensor units for capturing images (not shown). Optionally, the client device includes a location detection component 616, such as a GPS (global positioning satellite) sensor or other geo-location receiver, for determining the location of the client device (e.g., indoors, outdoors, or a specific room or area in an environment).

The memory 606 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 606, optionally, includes one or more storage devices remotely located from one or more processors 602. The memory 606, or alternatively the non-volatile memory within the memory 606, includes a non-transitory computer readable storage medium. In some implementations, the memory 606, or the non-transitory computer readable storage medium of the memory 606, stores the following programs, modules, and data structures, or a subset or superset thereof:

- an operating system 618 including procedures for handling various basic system services and for performing hardware dependent tasks;
- a network communication module 620 for connecting the client device 204 to other systems and devices (e.g., client devices, electronic devices, and systems connected to one or more networks 110) via one or more network interfaces 604 (wired or wireless);
- an input processing module 622 for detecting one or more user inputs or interactions from one of the one or more input devices 614 and interpreting the detected input or interaction;
- one or more applications 623 for execution by the client device (e.g., games, social network applications, application 624, and/or other web or non-web based applications) for controlling devices (e.g., sending commands, configuring settings, entering configuration data for electronic devices 222, etc., to hub devices and/or other client or electronic devices) and for reviewing data captured by the devices (e.g., device status and settings, captured data, event video clips, or other information regarding the hub device or other connected devices). In some implementations, the user is able to configure settings for the display assistant device 190 using the application 624, including settings for Monitoring (e.g., Live View, Event History, Notifications) on/off Mode, Home/Away Assist, and activity zones. In some implementations, the application 624 enables the user to schedule times that the camera 362 would be activated for home monitoring. In some implementations, the user is enabled to configure the quality of the images and/or video feed, bandwidth to be used, and settings for the microphones via the application 624. In some implementations, the application 624 provides user education (e.g., training videos, manuals, popup message notifications) that moving the electronic device 222 will distort what does and does not get recorded within activity zones. In some implementations, the application 624 disables zones or adjusts them when the electronic device 222 is moved around. In some implementations, the electronic device 222 is configured to send notifications to the cloud (e.g., to the server system 164) when it is moved;
- a user interface module 626 for providing and displaying a user interface in which settings, captured data, and/or other data for one or more devices (e.g., devices 120, voice-activated display assistant devices 190 in environment 100) can be configured and/or viewed;
- a client-side module 628, which provides client-side functionalities for device control, data processing and data review, including but not limited to:
  - a device control module 630 for generating control commands for modifying an operating mode of devices (e.g., electronic devices 222 and optionally other electronic devices) in accordance with user inputs;
  - a video analysis module 632 for providing received video data (e.g., event video clips) for viewing and/or for analyzing the video data to detect and/or recognize persons, objects, animals, and events;
  - a data review module 634 for providing user interfaces for reviewing data from the server system 164 or video sources 222, including but not limited to:
    - an event review module 636 for reviewing events (e.g., motion and/or audio events), and optionally enabling user edits and/or updates to the events; and
    - a persons review module 638 for reviewing data and/or images regarding detected persons and other entities, and optionally enabling user edits and/or updates to the persons data;
  - a presentation module 640 for presenting user interfaces and response options for interacting with the electronic devices 222 and/or the server system 164; and
  - a remote interaction module 642 for interacting with a remote person (e.g., a visitor to the environment 100), e.g., via an electronic device 222 and/or the server system 164; and
- client data 644 storing data associated with the user account and electronic devices, including, but not limited to:
  - account data 646 storing information related to both user accounts loaded on the client device and electronic devices (e.g., of the video sources 501) associated with the user accounts, wherein such information includes cached login credentials, hub device identifiers (e.g., MAC addresses and UUIDs), electronic device identifiers (e.g., MAC addresses and UUIDs), user interface settings, display preferences, authentication tokens and tags, password keys, etc.;
  - a local data storage 648 for selectively storing raw or processed data associated with electronic devices (e.g., of the video sources 222), optionally including entity data described previously; and
  - prior images 650 such as prior background images and/or entity images captured by camera(s) in various lighting conditions.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise rearranged in various implementations. In some implementations, the memory 606, optionally, stores a subset of the modules and data structures identified above. Furthermore, the memory 606, optionally, stores additional modules and data structures not described above.

Figure 7:
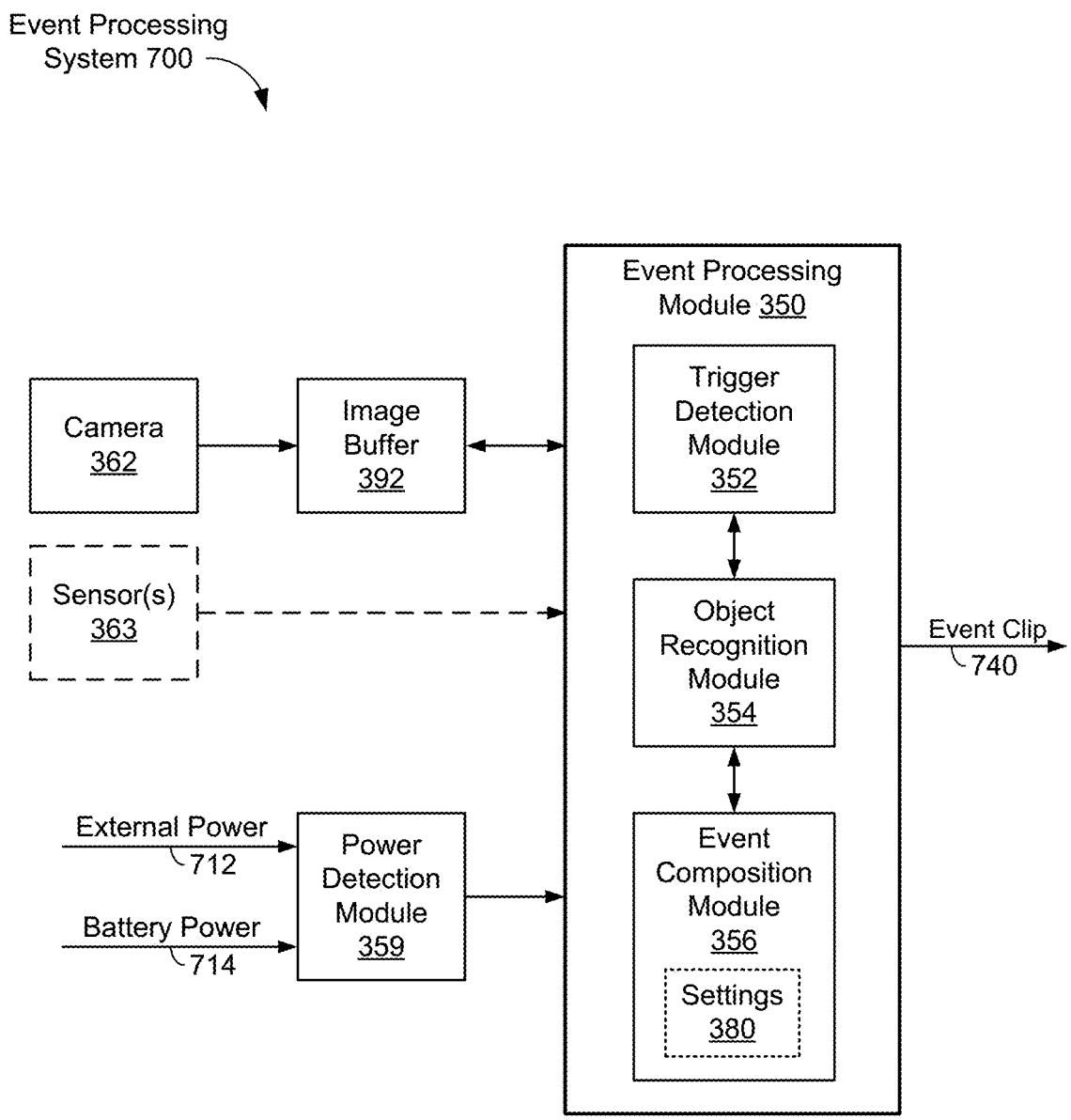
FIG. 7 is a block diagram illustrating an example event processing system in accordance with some implementations.

FIG. 7 is a block diagram of an event processing system 700 in accordance with some implementations. Features shared with FIG. 3 are similarly numbered, and some are not further discussed for purposes of brevity. In some implementations, the system 700 is implemented on an electronic device equipped with a camera (e.g., electronic device 222). In some implementations, various modules of the system 700 are implemented in a server system (e.g., 164), such as the object recognition module 354. The system 700 processes an event corresponding with a detected object of interest. Throughout this disclosure the term "event" refers to a portion of video data (e.g., a video clip) which includes something of interest to an occupant (e.g., a person or an object), or which includes an occurrence of interest (e.g., motion). The term "event" may also refer to the occurrence itself (e.g., a motion event) which is the basis of the video clip. Unless otherwise indicated, the terms "event," "clip," "event clip," and "video clip" are used interchangeably throughout this disclosure. Additional description regarding events, their components, and how they are composed is included below with reference to FIGS. 8 and 9.

Referring back to FIG. 7, an image sensor of the camera 362 captures image data and stores the image data as image frames in a buffer 392. In some implementations, the buffer is a circular buffer, meaning the oldest frames are constantly being rewritten by the newest frames, ensuring availability of a constantly updating log of previously captured frames. The trigger detection module 352 detects an event trigger. In some implementations, detecting a trigger comprises detecting motion in a field of view of the camera (e.g., by comparing subsequent frames to detect changing pixel values indicative of a moving object in the field of view, or by detecting motion from a motion sensor 363). In some implementations, detecting a trigger comprises detecting presence of an object in the foreground of the field of view of the camera (e.g., by subtracting current images from background reference images to detect foreground objects, or by detecting presence from a presence sensor 363). Upon detection of a trigger, the object recognition module 354 determines whether the trigger represents an object or occurrence of interest for the purpose of event creation. In some implementations, the object recognition module 354 performs an object or pattern recognition process (e.g., using computer vision techniques) to detect an identity of the object, an identity of a person, a type of object (e.g., person vs. animal vs. car vs. package), or any attribute of the object not otherwise known to the processing module 350 at the time of the trigger detection. The event composition module 356 composes an event clip 740 (as described in detail below with reference to FIGS. 8 and 9) in accordance with event profile settings 380. In some implementations, the event profile settings 380 are based on formulas 442 received from a server 164. In some implementations, the server selects the formulas 442 based on device configuration data of the device 222, at least part of which is based on a power type of the device. To that end, a power detection module 359 determines how the device 222 is being powered, either through an external power source 712 or through a battery 714. In some implementations, the power detection module 359 is connected to an external power bus and a battery power bus, and the power detection module 359 determines the power type based on whichever power bus is active. In some implementations, the formulas stored in event profile settings 380 include optimizations for both types of power. As such, the event composition module 356 composes an event clip in accordance with the power type currently being detected by the power detection module 359.

In some implementations, the power type information is set by the user during the configuration process. In some implementations, the power type is detected by the device itself (e.g., by the power detection module 359) and the device 222 (e.g., event processing module 350) adjust adjusts the event parameters 380 based on the detected power type. In some implementations, the detected power type is transmitted to the server 164 for inclusion in the formula setting process implemented by the device control module 418. In some implementations, the event recording parameters 380 dynamically update (e.g., based on changes in the configuration data, such as power type) without having to communicate with the server 164; in these implementations, the various event profiles are configured to automatically adjust upon detection of, for example, a change in the power type. For example, in some implementations, when a device 222 is unplugged, the device switches to a battery-powered mode, thereby causing the event processing module to change various event recording parameters for power saving purposes (e.g., shorter inactivity thresholds and event length settings, fewer objects of interest for inclusion in the priority settings 390, and so forth).

In some implementations, the event recording formulas are further updated to optimize for battery life for devices 222 being powered by a battery. For instance, as battery levels and/or estimated battery life values decrease, event recording parameters such as inactivity thresholds and maximum event length may decrease, cool-off parameters (e.g., the amount of time to wait until a new event is processed) may increase, and the list of objects and occurrences of interest for which events are configured to include may decrease, in order to further save battery power.

In some implementations, one or more of the above identified elements may be stored or otherwise implemented at a server system (e.g., server system 164). For instance, the event processing module 350 (or one or more of the modules 352, 354, 356, and 380 associated with the event processing module 350) may be stored at the server system 164. For such implementations, the electronic device 222 would transmit a video stream including image data obtained from the camera 362 and/or the image buffer 392 to the server system 164, and the event processing module 350 would perform trigger detection, object recognition, and/or event composition at the server system 164. As a result of one or more of the aforementioned processes, an event clip (e.g., event clip 740) would be transmitted from the server system 164 to the electronic device 222 and displayed (e.g., at an output device 312 of the electronic device 222).

FIG. 8 depicts an example event 810 in accordance with some implementations. The event is processed at an electronic device 222 (e.g., by an event processing system 700, FIG. 7). For the purpose of this example, the device 222 is located in a living room. However, the exact location of the device in this example is not meant to be limiting to the concepts described herein. The system 700 uses a formula 802 in accordance with the device's living room location. The living room formula 802 specifies padding parameters of 2 sec pre-roll and 2 sec post-roll, an inactivity threshold of 30 sec, and a maximum event length of 5 hours. The timing marks (A-E) in the figure sequentially occur over time. At time A, motion is detected (e.g., by the trigger detection module 352). The object recognition module 354 proceeds to determine identifying attributes of the motion. At time B, the motion is identified as having been caused by a person, recognized as being a person known to the system 700 (Bob). As such, the system 700 labels the event with the identity of the detected object and other information regarding the event (e.g., "Bob seen in the living room"). The event continues as long as the timing of the event (e.g., the amount of time that has passed since the initial trigger detection at time A) does not reach the maximum event length. At time C, the Bob exits the living room, and there is no more motion at time D, thereby causing the event to preliminarily end. At the preliminary event ending at time D, an inactivity count begins. Since the inactivity threshold in this example is 30 sec, the inactivity count beings at time D and ends 30 seconds later at time E. If there are no more trigger detections within the 30 second inactivity window (between times D and E), then the event composition module 356 ends the event and composes a video clip for the event subject to the padding parameters. The video clip begins at time A' which is 2 seconds before the trigger detection at time A, and ends at time D' which is 2 seconds after the subject of the event left the room at time D. The 2 second windows 814 and 816 (between times A' and A, and times D and D') represent the pre-roll and post-roll padding values and are useful for showing a user additional context of the event (e.g., the state of the room just before Bob entered, as well as the state of the room just after Bob left). The video clip for event 810 includes image data from the image frames captured during the padding windows 814 and 816, as well as data from the image frames captured during the motion window 812.

FIG. 9 depicts an example combined event 910 in accordance with some implementations. The event is processed at an electronic device 222 which is located in the living room, and is therefore also subject to the living room formula 802. Just as in FIG. 8, motion is detected at time A, an object in the scene is recognized as being Bob at time B, and Bob exits the room at time C, thereby ending the occurrence associated with the detected trigger at time D. Also, just as in FIG. 8, the 30 second inactivity threshold counter begins at time D. However, before the 30 second threshold can be reached at time F, another motion trigger is detected at time E. This motion is determined at time G to be associated with another known person, Charlie, who proceeds to exit at time H, thereby ending the subsequent motion-related occurrence at time I. Another inactivity window begins at time I, and 30 seconds later, at time J, the inactivity window ends with no additional triggers having been detected during the window. The ending of the inactivity window (upon having reached the inactivity threshold) triggers creation of a video clip for both events (since the subsequent event began during the inactivity window after the initial event). The video clip for the combined event 910 is created in accordance with the padding values 914 and 916; therefore, the clip begins at time A' (2 seconds before motion began at time A) and ends at time I' (2 seconds after the motion ended at time I). Importantly, the video clip for the combined event 910 only includes a single pre-roll window 914 and a single post-roll window 916, and the motion window 912 includes the detected occurrences of both events (e.g., both Bob's detection and Charlie's detection). As such, the system 700 labels the combined event with a single label describing both occurrences (e.g., "Bob and Charlie seen in the living room"). This single label conveys the information from multiple occurrences while providing for amore streamlined user experience through the display of a simpler user interface. Stated another way, rather than a plurality of events close in time being conveyed to the user as separate events/elements on the display, a combined event which summarizes all or a subset of the occurrences provides a cleaner approach to displaying a great deal of information that may have otherwise been ignored due to its quantity.

Figure 10:
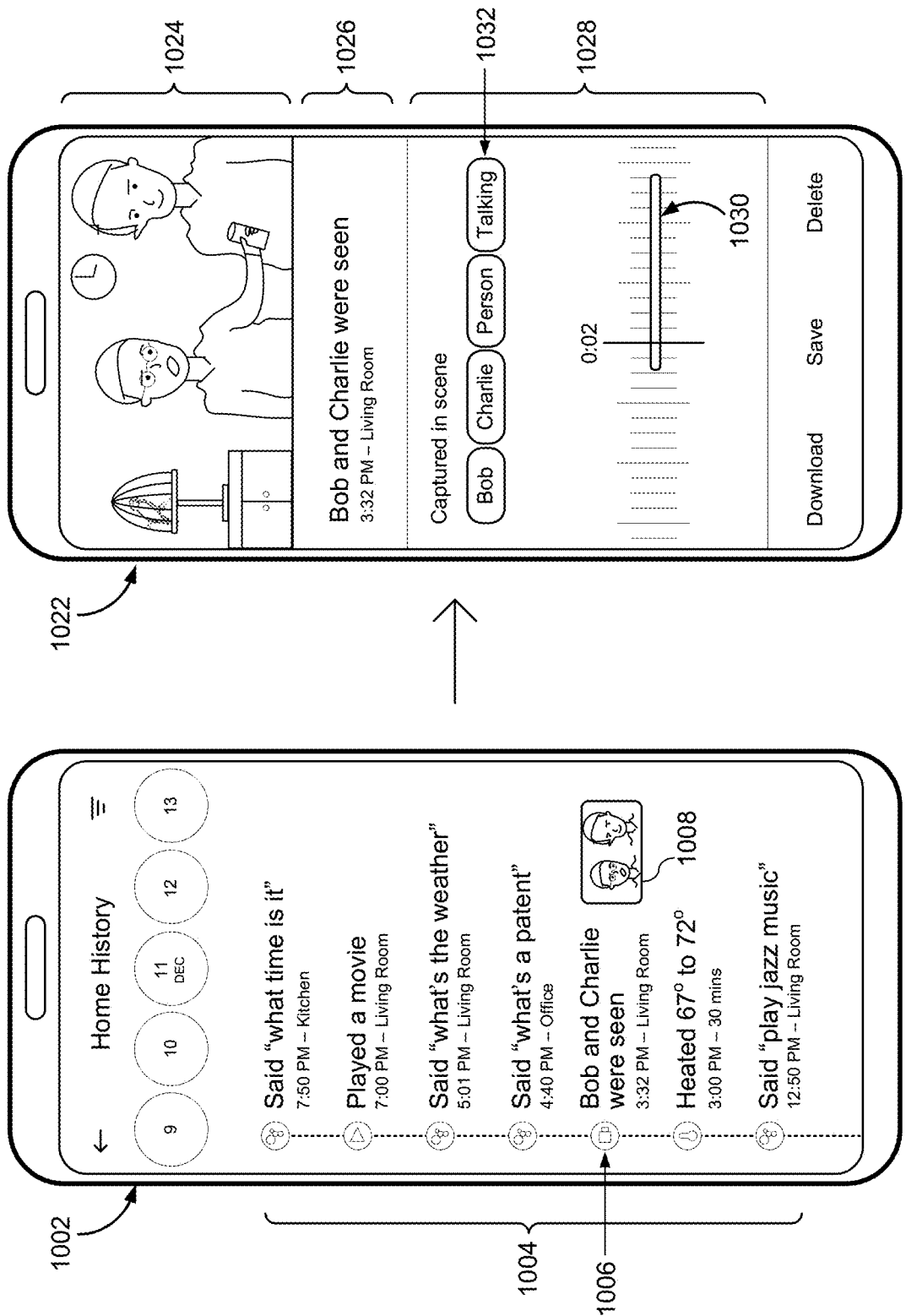
FIG. 10 is an example user interface for displaying an event in accordance with some implementations.

FIG. 10 depicts example user interfaces for displaying events (e.g., events 810 and 910). In some implementations, the user interfaces are implemented by a user interface module 626 of a client device 204.

interface 1002 includes a list of events 1004. Some of the events are video-based, like event 1006 (corresponding to event 910), and others are not. For instance, an event may be created when an occupant interacts with an assistant device 190 by asking a question (e.g., "what time is it") or by issuing a command (e.g., play jazz music), interacts with a TV 108 (e.g., by playing a movie), interacts with a thermostat 122 (e.g., turning the heat up), or interacts with any device in any way. For an event including image or video data, such as 1006, the list of events 1004 optionally includes a thumbnail 1008 including a screenshot associated with the event (e.g., an image including both Bob and Charlie).

Upon user selection of the event 1006 (e.g., via an input 614), a user interface 1022 is displayed. In some implementations, parts or all of the user interface 1022 are included in the user interface 1002. In some implementations, the user interface 1022 is presented separately (as shown in the figure). The elements in both user interfaces may be mixed and matched in other combinations without departing from the scope of the concepts described herein. The user interface 1022 displays the video data 1024 associated with the event. In some implementations, the video data 1024 is playable through selection of video controls (e.g., play, pause, and so forth). The interface includes the description 1026 of the event, including summary data (e.g., "Bob and Charlie were seen"), time and location data (e.g., 3:32 PM—Living Room), and/or other information describing the event. The interface also displays a visual representation 1030 of the length of the event which indicates event timing. In some implementations, the visual representation 1030 is a substantially rectangular shape (sometimes referred to as a pill), the length of which is based on the length of the event. In some implementations, the visual representation 1030 moves about its long axis (e.g., scrolls) as the video clip 1024 plays, indicating where the currently displayed portion of the clip 1024 is in relation to the event as a whole. In the figure, this is shown as a timeline with the clip 1030 having already advanced 2 seconds. Other visual representations of the event may be implemented without departing from the scope of the concepts described herein. In some implementations, the interface also includes detected attributes 1032 associated with event (e.g., results of the object recognition process). In the figure, these attributes include the identity of known persons detected in the scene (Bob, Charlie), a type of object detected in the scene (Person), and a type of occurrence detected in the scene (Talking).

Figure 11:
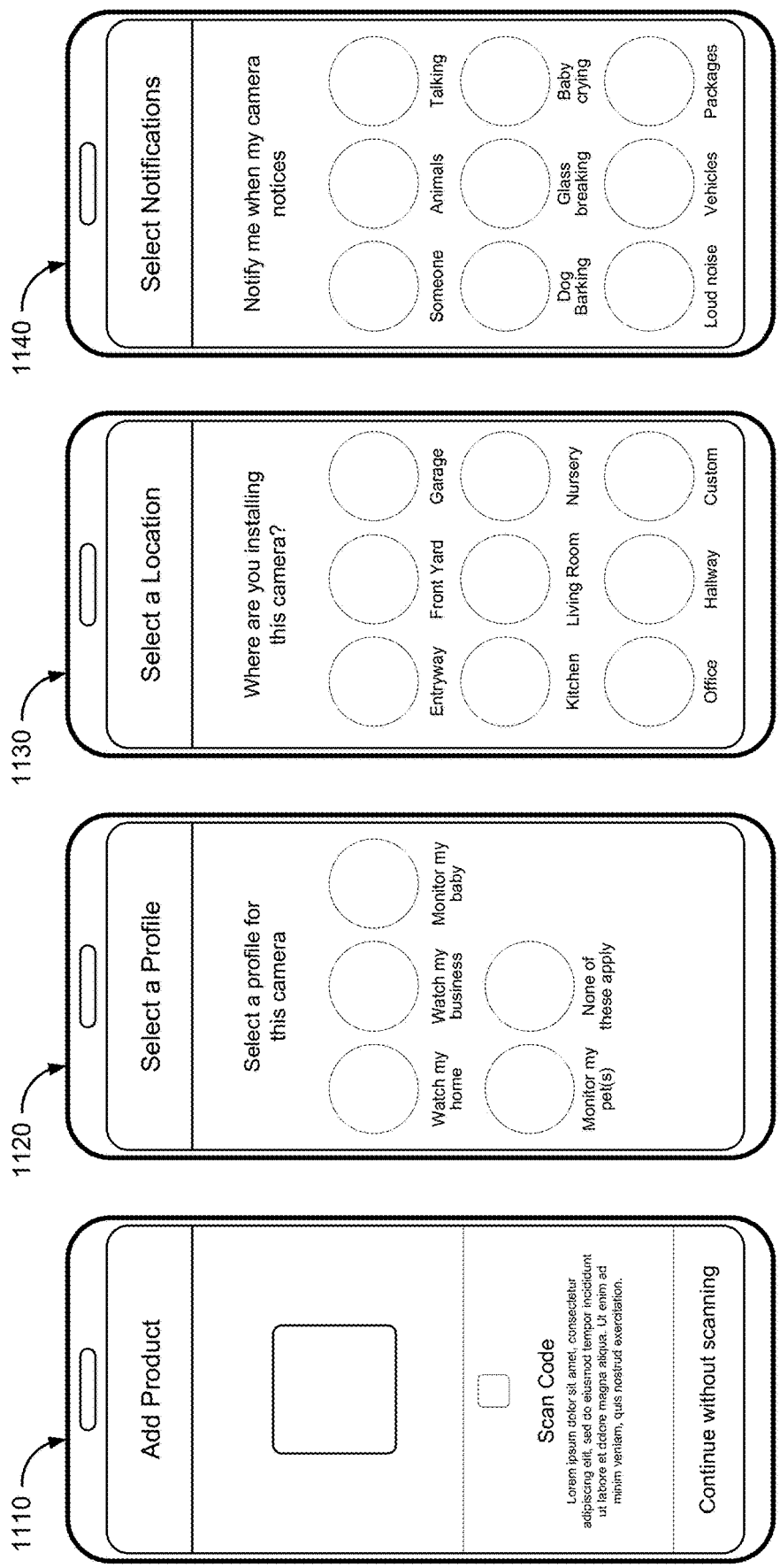
FIG. 11 is an example user interface for obtaining configuration data in accordance with some implementations.

FIG. 11 depicts example user interfaces for obtaining device configuration data 438 (e.g., location, purpose, and power data 449, FIG. 4) for electronic devices 222. In some implementations, the user interfaces are implemented by a user interface module 626 of a client device 204. In some implementations, as an occupant configures devices for the environment, the occupant uses an application (e.g., 624, FIG. 6) as part of the installation process.

User interface 1110 prompts the occupant to add a particular device (e.g., electronic device 222) for configuring in the application. In some implementations, the occupant scans a code (e.g., a QR code) or manually enters information used by the application for identifying the particular device.

User interface 1120 prompts the occupant to select a purpose for the device (e.g., in the form of a device profile, such as watching a home or business, acting as a baby monitor, and so forth). In some implementations, the identified profile is stored as purpose information 449*b* (FIG. 4) for the device at a server system 164.

User interface 1130 prompts the occupant to select a location for the device (e.g., an installation location, or a location at which the device is meant to be located during operation if the device is portable, such as a battery-powered security camera). In some implementations, the location includes a location type (e.g., indoors, outdoors), a specific room (e.g., living room, nursery), and/or an area or zone (e.g., entryway, hallway). In some implementations, the identified location data is stored as location information 449*a* (FIG. 4) for the device at a server system 164.

User interface 1140 prompts the occupant to select notifications for the device (e.g., detected objects and/or occurrences for which the occupant has an interest in receiving electronic notifications at a client device 204). In some implementations, the notifications correspond to identified people (e.g., a known person, an unknown person), object types (e.g., animals, vehicles, packages, people), an audio occurrence (e.g., dog barking, glass breaking, baby crying, loud noise), or any other type of object or occurrence (e.g., those included in the example formulas 442, FIG. 5). In some implementations, the notification selection data is stored as purpose information 449b (FIG. 4) for the device at a server system 164.

Figure 12:
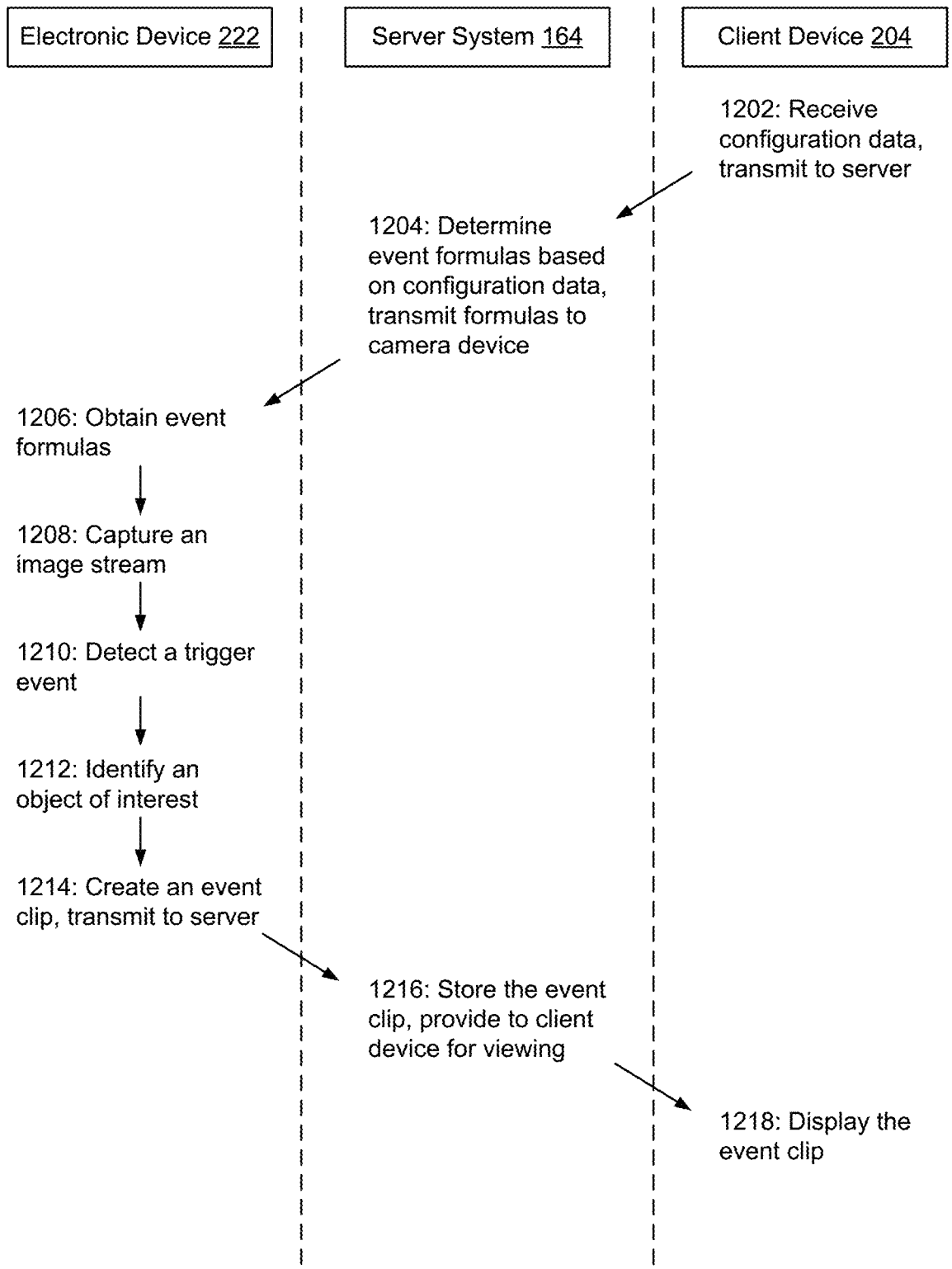
FIG. 12 is a flow diagram illustrating an example event processing process in accordance with some implementations.

FIG. 12 is a flow diagram of an event processing process 1200 in accordance with some implementations. The process may be performed at an electronic device (e.g., electronic device 222) having one or more processors (e.g., CPU(s) 302) and memory (e.g., memory 306) storing one or more programs for execution by the one or more processors; a server system (e.g., server system 164) having one or more processors (e.g., CPU(s) 402) and memory (e.g., memory 406) storing one or more programs for execution by the one or more processors; and/or a client device (e.g., client device 204) having one or more processors (e.g., CPU(s)) 602 and memory (e.g., memory 606) storing one or more programs for execution by the one or more processors. In some implementations, the electronic device, server system, and client device include one or more programs and memory storing one or more respective programs for execution by the one or more respective processors, and the one or more programs include instructions for performing the process 1200. In some implementations, respective non-transitory computer readable storage media store one or more respective programs, the one or more respective programs including instructions, which, when executed by the electronic device, the server system, and the client device, with one or more respective processors, cause the electronic device, the server system, and the client device to perform the process 1200.

The process 1200 begins when a client device 204 receives (1202) configuration data (e.g., one or more of location data 449a, purpose data 449b, and/or powerdata 449c) for a particular electronic device 222. In some implementations, the configuration data is received using one or more of the interfaces described above with reference to FIG. 11. Recognizing that users may have an interest in reviewing different kinds of event-related data based on a location of the event, the location data specifies an installation location of the device, or the location where the device is otherwise intended to monitor (e.g., with reference to user interface 1130). In addition, recognizing that users may have an interest in reviewing different kinds of event-related data based on the type of event, the purpose data specifies the device's intended usage, for example, based on device profiles (e.g., with reference to user interface 1120) or notification selections (e.g., with reference to user interface 1140). For instance, a user may be interested receiving events from an outdoor security camera if they include occurrences related to persons or packages in a field of view of the camera. However, the user may not be interested in receiving events from an outdoor security camera if they include occurrences related to loud noises or vehicles. Likewise, for an electronic device 222 being used as a baby monitor installed in a nursery, the user may be interested in receiving events if they are related to the sound of a baby crying, while occurrences such as vehicle and package detection would likely not be of interest.

The client device 204 transmits the configuration data to the server 164, which determines (1204) (e.g., using the device control module 418) one or more event formulas 442 based on the configuration data 438 and transmits those formulas to the particular electronic device 222. The device control module 418 determines the event formulas based on the configuration data. Stated another way, the server determines event parameters for a device such as padding, inactivity thresholds, and maximum event length based on the location and intended usage of the device. In some implementations, the formulas are dynamic—in other words, the parameters dynamically change based on the type of event, the type of detected object, the length of the event, and/or any other attribute defining or otherwise describing the event. In some implementations, the dynamic formulas set the parameters 443 to initial values which are configured to dynamically change based on the aforementioned event-related attributes. In some implementations, the server transmits one or more event formulas 442 as an event recording profile to the electronic device 222. In some implementations, the server transmits individual formulas 442 to the electronic device 222.

The electronic device 222 captures, receives, or otherwise obtains (1206) the event formulas from the server 164. In some implementations, the device obtains an event recording profile including profile recording parameters 380 from the server. In some implementations, the parameters 380 are set by the event formulas and/or the event recording profiles including the formulas. The event recording parameters 380 are used for the targeted event recording operations of the device 222 (e.g., targeted recording of events), and they include parameters such as padding parameters 382 (e.g., the amount of time to record before and after detection of an object of interest, see 914 and 916 in FIG. 9 for examples), inactivity thresholds 384 (e.g., the amount of time to wait before ending an event instead of continuing the event to include subsequent activity, see times D and I in FIG. 9 for examples), maximum event length parameters 386 (e.g., how long the event may last before the device ceases recording), cool-off parameters 388 (e.g., a rate of object detections above which the recording of an event ceases), and/or object filters and priority settings 390 (e.g., determining which objects may count as a basis for recording an event, see the example formulas in FIG. 5 for examples). In some implementations, these adjustable parameters had been set by the server based on the configuration data 438 of the electronic device 222, such as (i) the location of the device (e.g., indoors, outdoors, which room, and so forth), (ii) the intended use of the device (e.g., what is in the field of view of the device, and what the user is interested in seeing), and/or (iii) the power type of the device (e.g., wired or battery-powered).

The electronic device 222 captures, receives, or otherwise obtains (1208) a video stream (e.g., a plurality of images of a scene captured by the camera 362) and, in some implementations, stores at least a portion of the video stream locally on the device 222 (e.g., in a buffer 392). The device 222 detects (1210) a trigger event based on the obtained video stream (e.g., based on one or more of the plurality of images of the scene by, for example, detecting motion or another trigger as described with reference to trigger detection module 352 above). In response to detecting the trigger event, the device 222 identifies (1212) an object or occurrence of interest in one or more of the plurality of images of the scene (e.g., by performing one or more object recognition processes as described with reference to object recognition module 354 above). The device 222 creates (1214) an event clip from the stored images that include the object of interest, subject to the event recording and processing settings 380 (e.g., as described with reference to event composition module 356 above). The device 222 provides the event clip for display. In some implementations, providing the event clip for display includes transmitting the event clip to the server 164 or a hub 180 for storage (1216) and later viewing (1218) at a client device 204. In some implementations, especially if the device 222 includes a display screen, providing the event clip for display includes storing the event clip locally and displaying the event clip at the device 222 (e.g., in response to a user opening or otherwise selecting the event clip for display).

In some implementations, the event recording formulas are subject to machine learning algorithms, either implemented at the device 222 or at a server 164, in order to further optimize the quality of event detection and processing from the user's perspective. For instance, in some implementations, an occupant inputs feedback, using the client device 204, pertaining to one or more events (e.g., 1006, FIG. 10). Example feedback includes rejection feedback (e.g., for events and/or their underlying objects or occurrences which the occupant classifies as irrelevant or otherwise not of interest), and/or customization feedback for adjusting one or more of the event recording parameters in a particular formula (e.g., adjusting padding values for a particular type of object detection, adjusting the maximum event length value for a particular type of detected occurrence, and so forth). In some implementations, a machine learning module adjusts subsequent event profile settings 380 for particular types of events and device configurations based on the occupant feedback.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Additionally, it will be understood that, although the terms "first," "second," etc. may be used herein to describe various elements, these elements should not be limited by these terms. These terms are only used to distinguish one element from another.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

The above description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method, comprising:
receiving profile recording parameters for an electronic device, the profile recording parameters associated with configuration data of the electronic device, the configuration data including a location type or a power type of the electronic device;
receiving a plurality of images of a scene captured by one or more image sensors associated with the electronic device;
detecting a trigger event based on at least one captured image of the plurality of captured images of the scene;
in response to detecting the trigger event, identifying an object of interest in one or more captured images of the plurality of captured images of the scene;
creating an event clip from the one or more captured images, the event clip including the object of interest, the creating the event clip including:
configuring a clip length based on the profile recording parameters, the configuring the clip length including:
selecting an inactivity threshold that corresponds to a number of captured images of the plurality of captured images of the scene in which the object of interest is no longer detected, the number of captured images corresponding to an amount of time to wait before the trigger event ends;
selecting a maximum event length for the clip length that corresponds to a maximum number of images or a maximum amount of time for the event clip; and
combining the number of captured images with the one or more captured images of the plurality of captured images in which the object of interest is identified; and
providing the event clip for display, the event clip having no more than the maximum event length.

2. The method of claim 1, wherein:
configuring the clip length includes selecting a padding value, the padding value corresponding to a number of captured images preceding the one or more captured images of the plurality of captured images that include the object of interest; and combining the number of captured images with the one or more captured images of the plurality of captured images that include the object of interest further includes combining the number of captured images preceding the one or more captured images of the plurality of captured images that include the object of interest.

3. The method of claim 1, wherein:
the configuration data includes the location type corresponding to a particular area of an environment; and
configuring the event length based on the profile recording parameters includes selecting at least one of a padding value, the inactivity threshold, or the maximum event length based on the particular area of the environment.

4. The method of claim 1, wherein:
the configuration data is the power type; and
configuring the event length based on the profile recording parameters includes selecting at least one of a padding value, the inactivity threshold, or the maximum event length based on whether the power type of the electronic device is wired or battery powered.

5. The method of claim 1, wherein:
the configuration data further includes object priority data; and
configuring the event length based on the profile recording parameters includes selecting at least one of a padding value, the inactivity threshold, or the maximum event length based on a priority of the object of interest in accordance with the object priority data.

6. The method of claim 1, wherein configuring the clip length further includes setting a cool-off value corresponding to an amount of time to wait between successive object detections after two or more object detections occur within a threshold amount of time.

7. The method of claim 1, wherein configuring the clip length includes setting at least one of a padding value, the inactivity threshold, or the maximum event length in accordance with a combination of values associated with the profile recording parameters.

8. The method of claim 1, wherein detecting the trigger event includes detecting motion in the scene based on an analysis of two or more of the plurality of captured images of the scene.

9. The method of claim 1, wherein detecting the trigger event includes detecting the object of interest in the scene based on an analysis of one or more of the plurality of captured images of the scene.

10. The method of claim 1, further comprising:
combining the event clip with a previously created event clip to form a combined event clip, and wherein providing the event clip for display includes providing the combined event clip for display.

11. The method of claim 1, wherein configuring the clip length further includes setting a padding value.

12. The method of claim 1, wherein creating the event clip further includes ending the event clip upon reaching the maximum number of images or the maximum amount of time.

13. An electronic device, comprising:
one or more processors; and
memory storing instructions that, when executed by the one or more processors, cause the one or more processors to:
receive profile recording parameters for the electronic device, the profile recording parameters associated with configuration data of the electronic device, the configuration data including a location type or a power type of the electronic device;
receive a plurality of images of a scene captured by one or more image sensors associated with the electronic device;
detect a trigger event based on at least one captured image of the plurality of captured images of the scene;
in response to the detection of the trigger event, identify an object of interest in one or more captured images of the plurality of captured images of the scene;
create an event clip from the one or more captured images, the event clip including the object of interest, the creation of the event clip comprises:
a configuration of a clip length based on the profile recording parameters, the configuration of the clip length comprises:
a selection of an inactivity threshold that corresponds to a number of captured images of the plurality of captured images of the scene in which the object of interest is no longer detected, the number of captured images corresponds to an amount of time to wait before the trigger event ends;
a selection of a maximum event length for the clip length that corresponds to a maximum number of images or a maximum amount of time for the event clip; and
a combination of the number of captured images with the one or more captured images of the plurality of captured images which identify the object of interest; and
provide the event clip for display, the event clip having no more than the maximum event length.

14. The electronic device of claim 13, wherein:
the configuration of the clip length includes selecting the a padding value, the padding value corresponding to a number of captured images preceding the one or more captured images of the plurality of captured images that include the object of interest; and
the combination of the number of captured images with the one or more captured images of the plurality of captured images that include the object of interest further includes a combination of the number of captured images preceding the one or more captured images of the plurality of captured images that include the object of interest.

15. The electronic device of claim 13, wherein:
the configuration data includes the location type corresponding to a particular area of an environment; and
the configuration of the event length based on the profile recording parameters includes selecting at least one of a padding value, the inactivity threshold, or the maximum event length based on the particular area of the environment.

16. The electronic device of claim 13, wherein:
the configuration data is the power type; and
the configuration of the event length based on the profile recording parameters includes selecting at least one of a padding value, the inactivity threshold, or the maximum event length based on whether the power type of the electronic device is wired or battery powered.

17. The electronic device of claim 13, wherein:
the configuration data further includes object priority data; and
the configuration of the event length based on the profile recording parameters includes a selection of at least one of a padding value, the inactivity threshold, or the maximum event length based on a priority of the object of interest in accordance with the object priority data.

18. The electronic device of claim 13, wherein the configuration of the clip length includes an establishment of a cool-off value corresponding to an amount of time to wait between successive object detections after two or more object detections occur within a threshold amount of time.

19. The electronic device of claim 13, wherein the configuration of the clip length further includes setting a padding value.

20. The electronic device of claim 13, wherein the creation of the event clip further includes ending the event clip upon reaching the maximum number of images or the maximum amount of time.

* * * * *

UNITED STATES PATENT AND TRADEMARK OFFICE
CERTIFICATE OF CORRECTION

PATENT NO. : 12,381,998 B2  
APPLICATION NO. : 18/543961  
DATED : August 5, 2025  
INVENTOR(S) : John Jordan Nold et al.

Page 1 of 1

It is certified that error appears in the above-identified patent and that said Letters Patent is hereby corrected as shown below:

In the Claims

Column 34, Lines 41-42, Claim 1 after "selecting" before "a padding", delete "the"

Signed and Sealed this  
Sixteenth Day of September, 2025

Coke Morgan Stewart  
*Acting Director of the United States Patent and Trademark Office*